(12) United States Patent
Cho et al.

(10) Patent No.: US 10,101,876 B2
(45) Date of Patent: Oct. 16, 2018

(54) USER INTERFACE FOR A MOBILE DEVICE WITH LATERAL DISPLAY SURFACES

(71) Applicant: LG Electronics Inc., Seoul (KR)

(72) Inventors: Jinho Cho, Seoul (KR); Hokyung Ka, Seoul (KR); Egun Jung, Seoul (KR); Yeongnam Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/628,476

(22) Filed: Feb. 23, 2015

(65) Prior Publication Data

US 2015/0248200 A1    Sep. 3, 2015

(30) Foreign Application Priority Data

Mar. 3, 2014  (KR) .................. 10-2014-0024984
Jul. 1, 2014   (KR) .................. 10-2014-0081737

(51) Int. Cl.
| | |
|---|---|
| *G06F 3/0482* | (2013.01) |
| *G06F 1/16* | (2006.01) |
| *G06F 3/0488* | (2013.01) |
| *G06F 3/0354* | (2013.01) |
| *G06F 3/0484* | (2013.01) |
| *H04M 1/02* | (2006.01) |

(52) U.S. Cl.
CPC .......... *G06F 3/0482* (2013.01); *G06F 1/1652* (2013.01); *G06F 3/03547* (2013.01); *G06F 3/04845* (2013.01); *G06F 3/04886* (2013.01); *G06F 2203/04803* (2013.01); *H04M 1/0268* (2013.01); *H04M 2250/16* (2013.01)

(58) Field of Classification Search
CPC .............. G06F 3/0482; G06F 3/03547; G06F 3/04845; G06F 3/04886; G06F 1/1652
See application file for complete search history.

(56) References Cited

U.S. PATENT DOCUMENTS

| | | | |
|---|---|---|---|
| 2004/0066408 A1* | 4/2004 | Meyers ................. | G06F 3/0481 715/764 |
| 2008/0174564 A1* | 7/2008 | Kim ...................... | G06F 3/0488 345/173 |
| 2010/0060664 A1* | 3/2010 | Kilpatrick, II ........ | G06F 1/1616 345/650 |
| 2011/0175930 A1 | 7/2011 | Hwang et al. | |
| 2011/0237230 A1 | 9/2011 | Li et al. | |
| 2013/0111384 A1* | 5/2013 | Kim ...................... | G06F 3/048 715/765 |
| 2013/0176248 A1 | 7/2013 | Shin et al. | |

(Continued)

FOREIGN PATENT DOCUMENTS

| | | |
|---|---|---|
| CN | 101997961 A | 3/2011 |
| CN | 102436345 A | 5/2012 |

(Continued)

*Primary Examiner* — Justin R. Blaufeld
(74) *Attorney, Agent, or Firm* — Birch, Stewart, Kolasch & Birch, LLP

(57) ABSTRACT

A mobile terminal including a display unit having a main display region exposed on a front surface and an auxiliary display region exposed on a lateral surface; and a controller configured to display at least one display object on the main display region, and move the at least one display object from the main display region to the auxiliary display region in response to a received move command.

22 Claims, 30 Drawing Sheets

(56) References Cited

U.S. PATENT DOCUMENTS

| | | | |
|---|---|---|---|
| 2013/0300697 A1 | 11/2013 | Kim et al. | |
| 2013/0332870 A1 | 12/2013 | Kim et al. | |
| 2015/0015511 A1* | 1/2015 | Kwak | G06F 3/0416 345/173 |
| 2015/0109207 A1 | 4/2015 | Li et al. | |
| 2015/0339804 A1* | 11/2015 | Kim | G06F 3/04886 345/659 |
| 2016/0034132 A1* | 2/2016 | Huang | G06F 3/017 345/173 |

FOREIGN PATENT DOCUMENTS

| | | |
|---|---|---|
| CN | 103345409 A | 10/2013 |
| WO | WO 2014/023118 A1 | 2/2014 |

\* cited by examiner

FIG. 3
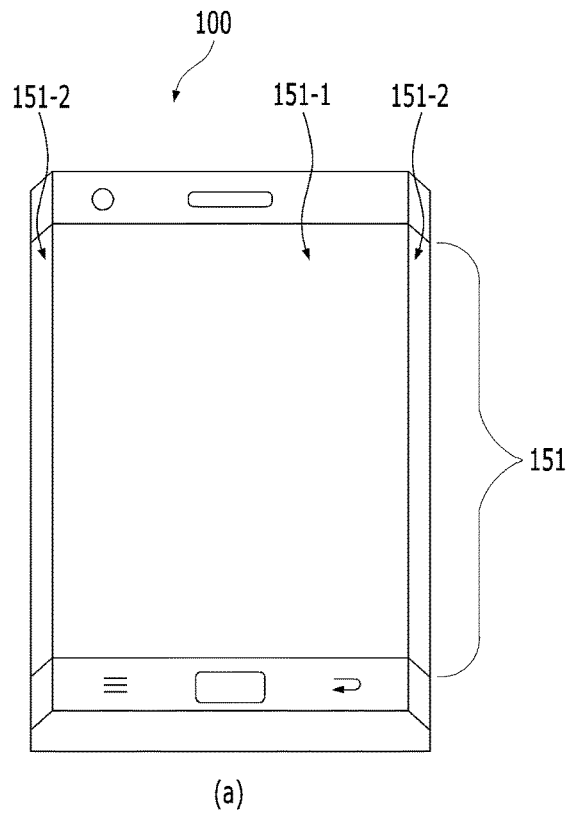
(a)
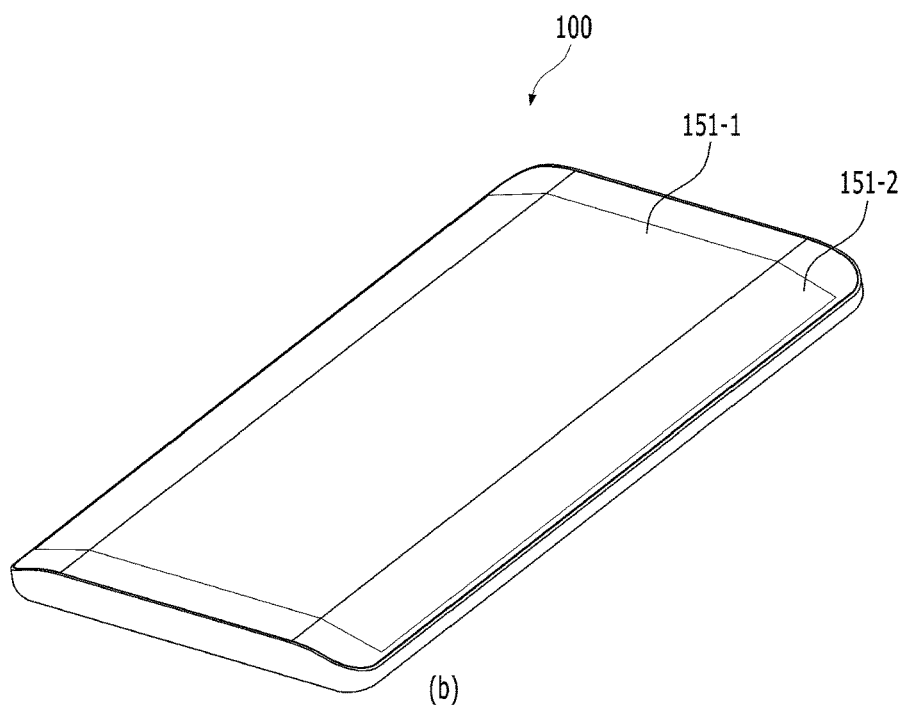
(b)

| Indicator | | Display information |
|---|---|---|
| 1401a | 🏢 | Communication service provider |
| 1401b | 📱 | Sound/Vibration |
| 1401c | ⏰ | Alarm |
| 1401d | LTE ↑↓ | Data communication |
| 1401e | 📶 | Signal strength |
| 1401f | 🔋 | Remaining battery level |
| 1401g | 03:13PM | Current hour |

(a)        (b)

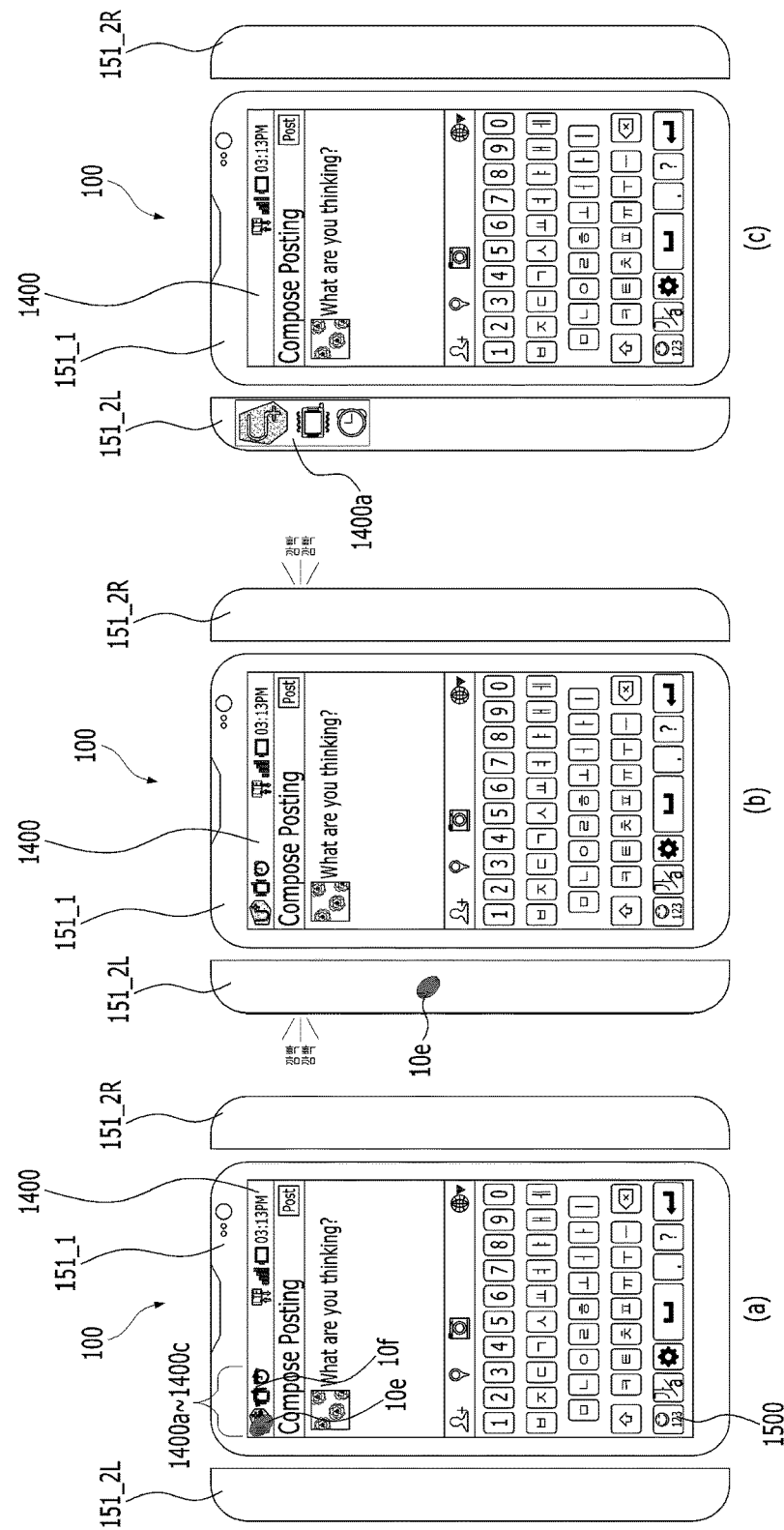

FIG. 26
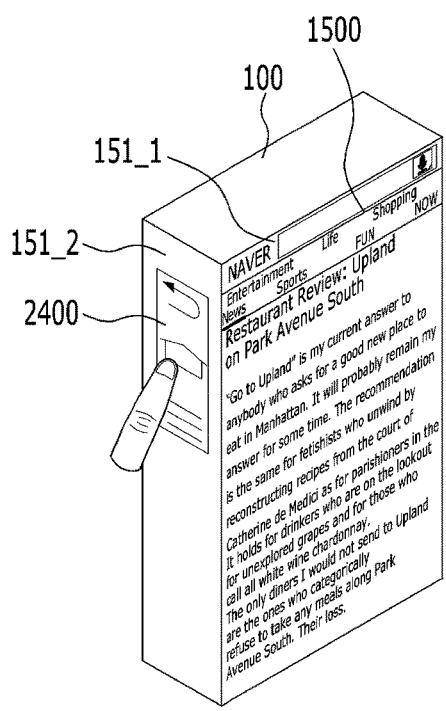
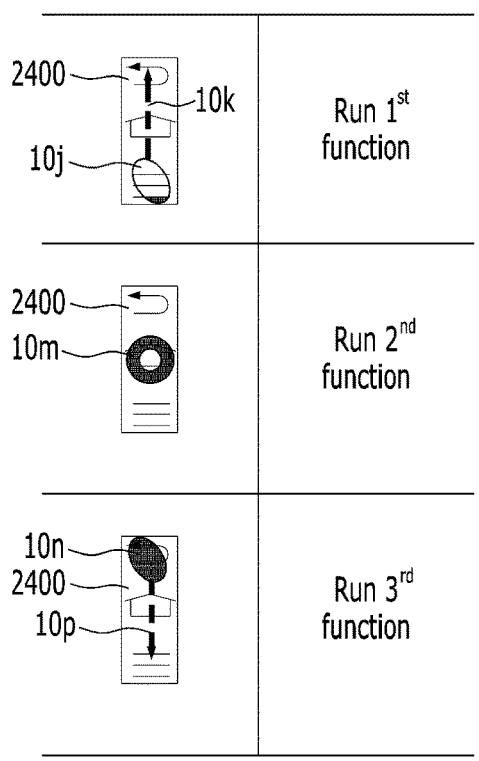
(a)  (b)

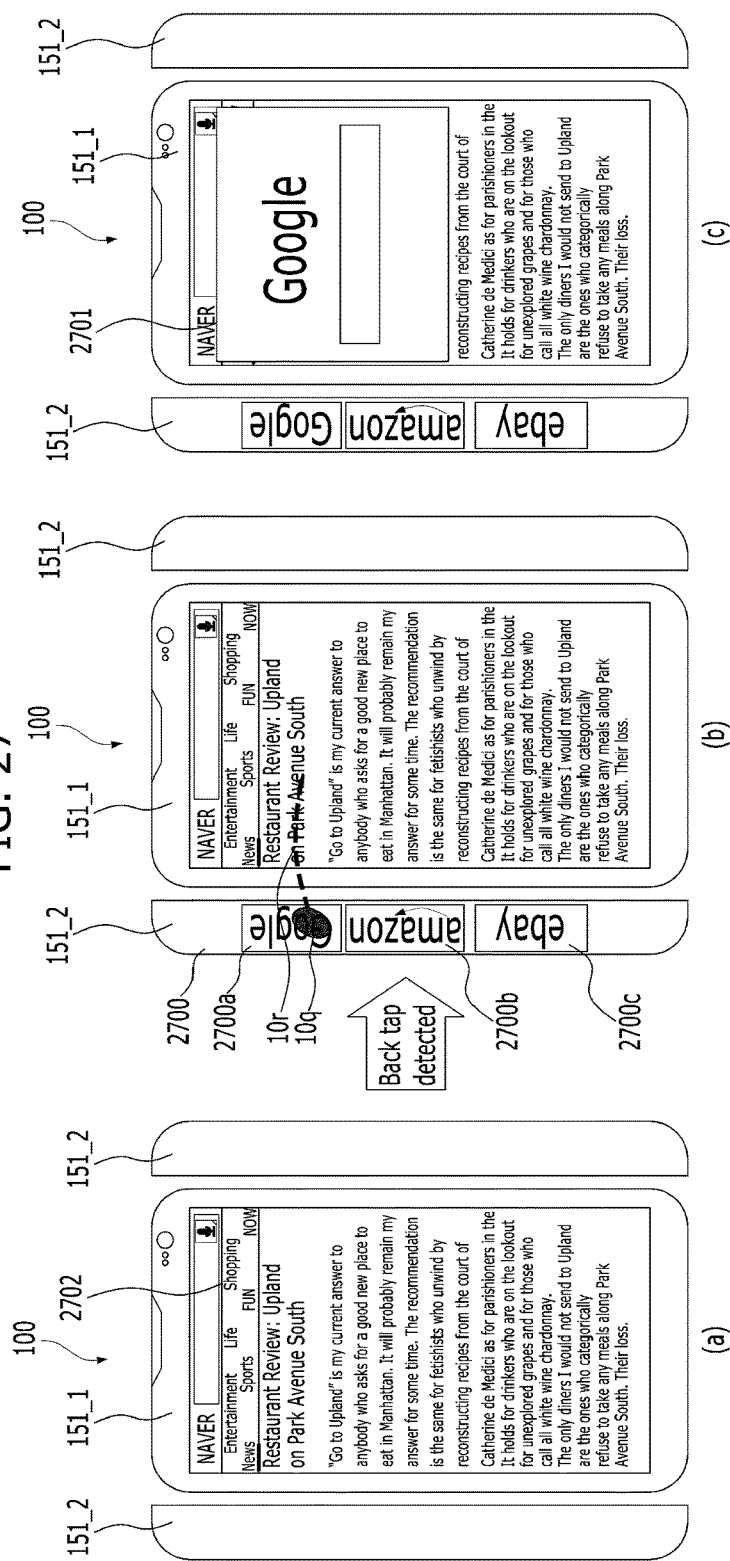

USER INTERFACE FOR A MOBILE DEVICE WITH LATERAL DISPLAY SURFACES

Pursuant to 35 U.S.C. § 119(a), this application claims the benefit of earlier filing date and right of priority to Korean Application Nos. 10-2014-0024984, filed on Mar. 3, 2014 and 10-2014-0081737 filed on Jul. 1, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. And, the mobile terminals can be further classified into handheld terminals and vehicle mounted terminals. Generally, a mobile terminal is configured in a hexahedral shape. However, a shape of a mobile terminal tends to be diversified owing to the ongoing developments of flexible displays. For instance, if a flexible display is employed, a mobile terminal can have a cylindrical shape deviating from the traditional hexahedral shape.

Thus, if a mobile terminal is configured in a cylindrical shape, a display may not be exposed on a front face of the mobile terminal. Hence, the demand for developing a new user interface (UI) applicable to a flexible display employed mobile terminal is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a UI (user interface) suitable for a flexible display employed mobile terminal can be provided.

To achieve these objects and other advantages and in accordance with the purpose of the invention, as embodied and broadly described herein, a mobile terminal according to an embodiment of the present invention may include a display unit having a main display region exposed on a front surface and an auxiliary display region exposed on a lateral surface and a controller controlling the display unit to output at least one or more display objects through the main display region, the controller, if a move command is received, controlling the display unit to output at least one display object selected from the output at least one or more display objects by moving the selected at least one display object to the auxiliary display region.

In another aspect of the present invention, as embodied and broadly described herein, a method of controlling a mobile terminal including a display unit having a main display region exposed on a front surface and an auxiliary display region exposed on a lateral surface according to an embodiment of the present invention may include a first output step of outputting at least one or more display objects through the main display region and a second output step of if a move command is received, outputting at least one display object selected from the output at least one or more display objects by moving the selected at least one display object to the auxiliary display region.

Both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures:

FIG. 3 is a diagram illustrating one example of a mobile terminal having a main display region and an auxiliary display region;

FIGS. 17 to 19 are diagrams illustrating a method of distinguishing and outputting an indicator region based on a user's indicator moving command according to an embodiment of the present invention, respectively;

FIG. 26 is a diagram illustrating a controlling method of running a function button output to an auxiliary display according to one embodiment of the present invention; and FIG. 27 is a diagram illustrating a controlling method of outputting a list of recently accessed webpages during an output of a web browser running screen according to one embodiment of the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein illustrating various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
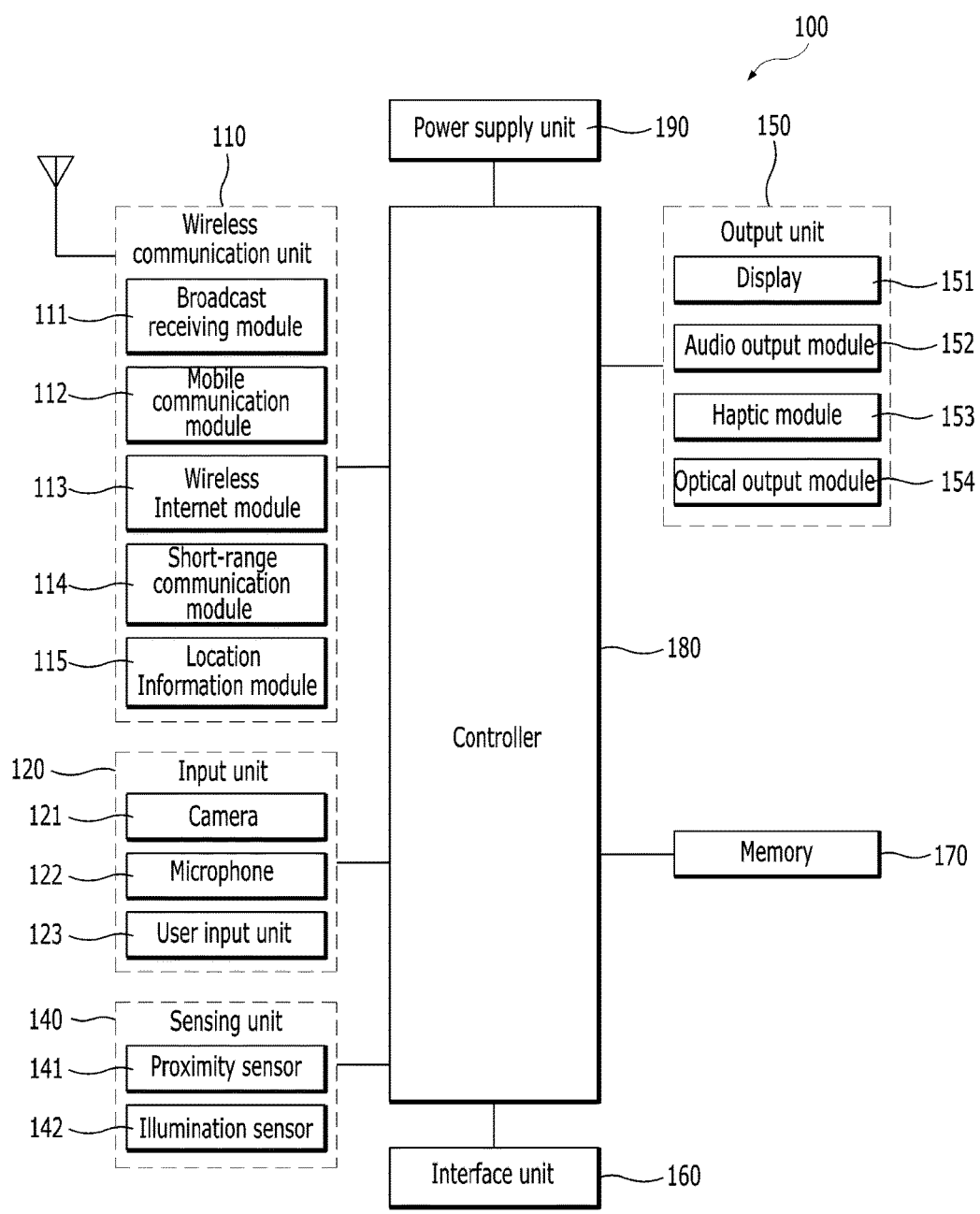
FIG. 1A is a block diagram illustrating a mobile terminal according to one embodiment of the present invention.
Figure 1B:
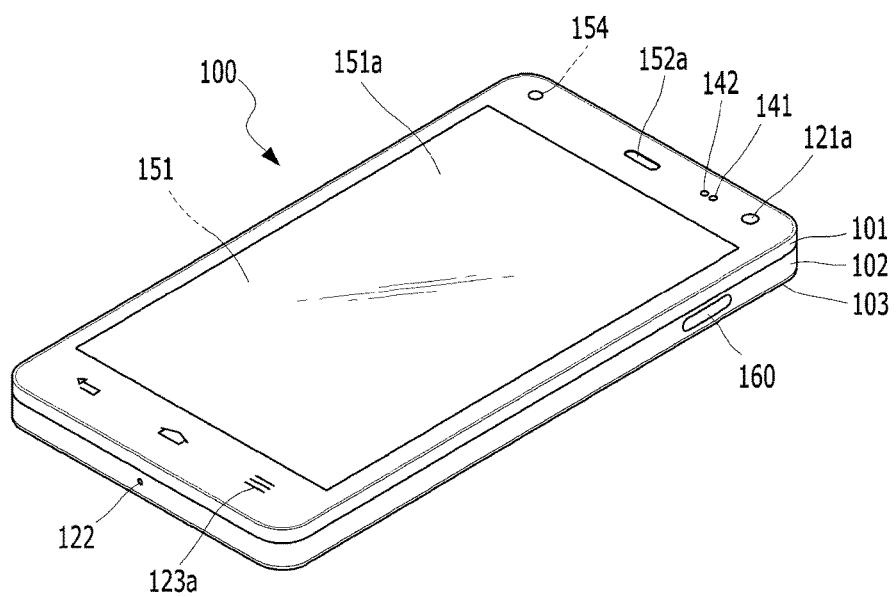
FIGS. 1B and 1C are front and rear perspective diagrams of a mobile terminal according to one embodiment of the present invention.
Figure 1C:
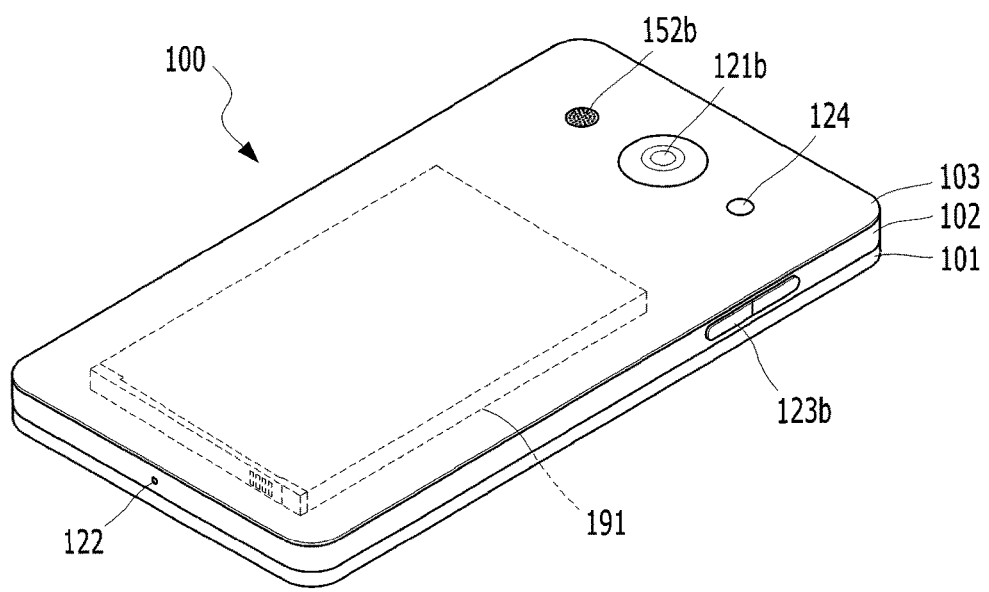

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
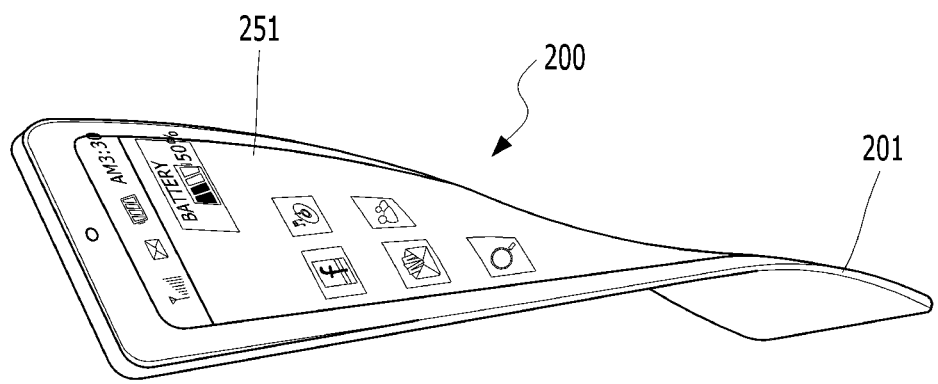
FIG. 2 is a diagram illustrating another example of a transformable mobile terminal according to an embodiment of the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, the controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 251, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

FIG. 3 is a diagram illustrating one example of a mobile terminal 100 having a main display region and an auxiliary display region. Like the example shown in FIG. 3(a), a main display 151-1 may include a display region exposed on a front surface of the mobile terminal 100. And, an auxiliary display 151-2 may include a display region exposed on a lateral surface of the mobile terminal 100. FIG. 3(b) is a perspective diagram of the mobile terminal 100.

Each of the main display 151-1 and the auxiliary display 151-2 may be implemented with separate electronic parts. Further, if the display unit 151 includes a flexible display that can be freely bent, the main display 151-1 and the auxiliary display 151-2 can be configured by bending at least one side end of the flexible display.

According to the example shown in FIG. 3, the auxiliary display 151-2 is provided to each of right and left lateral surfaces of the mobile terminal 100. Optionally, the auxiliary display 151-2 may be provided to one of the right and left surfaces of the mobile terminal 100. According to one embodiment of the present invention, a controlling method for securing a wider screen on a main display 151-1 by moving an indicator region configured to occupy a prescribed region of the main display 151-1 to an auxiliary display 151-2 is provided.

Figure 4:
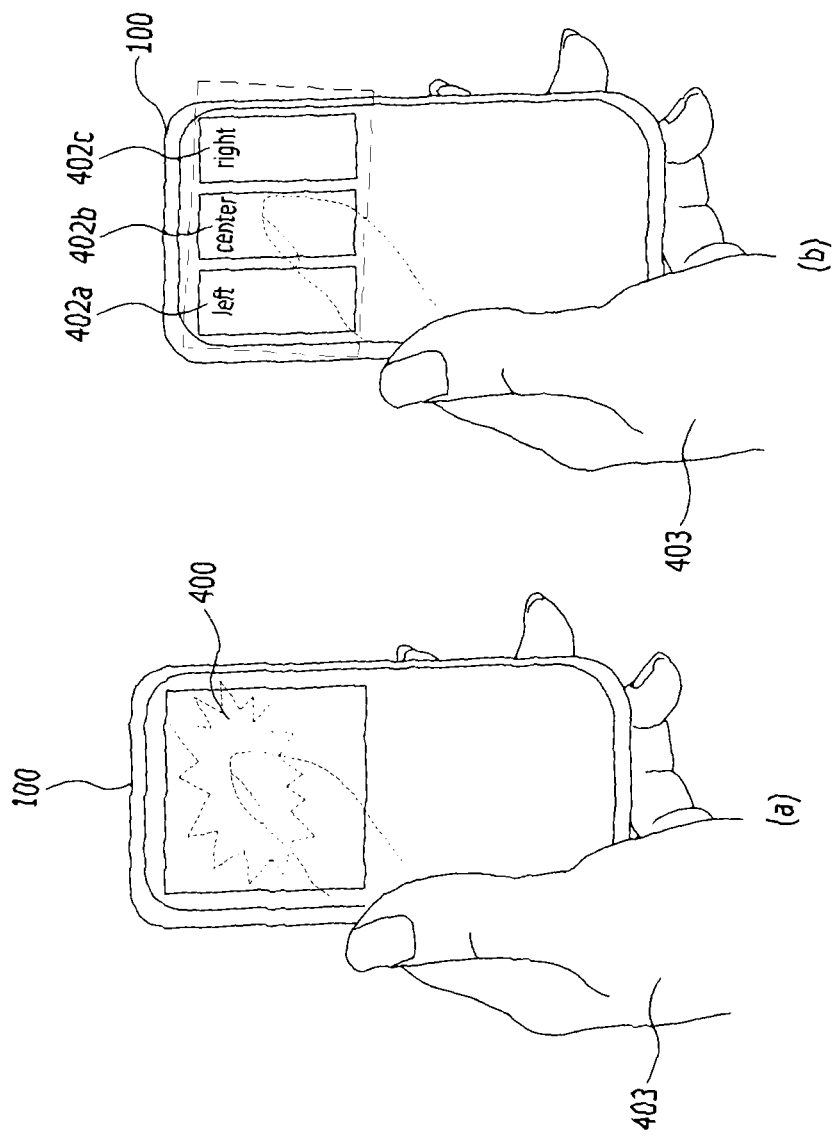
FIG. 4 is a diagram illustrating a tapping (knocking) input applied to a rear surface of a mobile terminal according to one embodiment of the present invention.

FIG. 4 is a diagram illustrating a tapping (knocking) input applied to a rear surface of a mobile terminal according to one embodiment of the present invention. According to one embodiment of the present invention, a mobile terminal is controlled by detecting a tapping (knocking) input 400 to a rear surface of the mobile terminal. In the following description of an embodiment of the present invention, a tapping input to a rear surface of a mobile terminal is called a back tap input 400.

FIG. 4(a) is a diagram illustrating a back tap input 400 received through a user's hand 403. According to one embodiment of the present invention, the controller 180 can detect a back tap input 400 using at least one of an acceleration sensor, a gravity sensor and a gyroscope sensor of the sensing unit 140. For instance, when a back tap input 400 is received, if an acceleration change in a specific direction received from the acceleration sensor is detected, the controller 180 can determine that a back tap input is received.

According to another embodiment of the present invention, the controller can detect a back tap input 400 using a back tap detection sensor additionally provided to a rear surface of the mobile terminal 100. The back tap detection sensor may include such a sensor for detecting a user's tapping as a piezoelectric sensor, a touch sensor or the like. The embodiments of the present invention are non-limited by the method of detecting the back tap input 400. And, various detecting methods for detecting back tap inputs can be applied to the embodiments of the present invention.

Moreover, according to one embodiment of the present invention, a back tap input 400 can be distinguished into a left back tap input, a right back tap input or a middle back tap input depending on a received location of the back tap input 400. Referring to FIG. 4(b), the controller 180 can distinguish a back tap input received through a left side 402a of a rear surface of the mobile terminal, a back tap input received through a middle side 402b of the rear surface of the mobile terminal, and a back tap input received through a right side 402c of a rear surface of the mobile terminal into a left back tap input, a middle back tap input and a right back tap input, respectively. This distinguishing method may be identical to the aforementioned back tap input detecting method.

Moreover, according to one embodiment of the present invention, a back tap input with a left hand and a back tap input with a right hand shall be distinguished from each other as well as the back tap input to the left side 402a, the back tap input to the middle region 402b and the back tap input to the right side 402c. The controller 180 can perform such distinguishment using whether a change of acceleration speed received through an acceleration sensor corresponds to a prescribed direction and/or a prescribed shape. In particular, a tapping input applied to each of the left side 402a, the middle region 420b and the right side 402 using a left hand shall be distinguished from a tapping input applied to each of the left side 402a, the middle region 420b and the right side 402 using a right hand.

Next, a control method based on the detected back tap input (including the distinguishment for left/right side and the left/right hand) is explained in detail. According to one embodiment of the present invention, a more intuitive function is mapped to a back tap input. In particular, when a user applies a back tap input, an executing function can be intuitively recognized.

Figure 5:
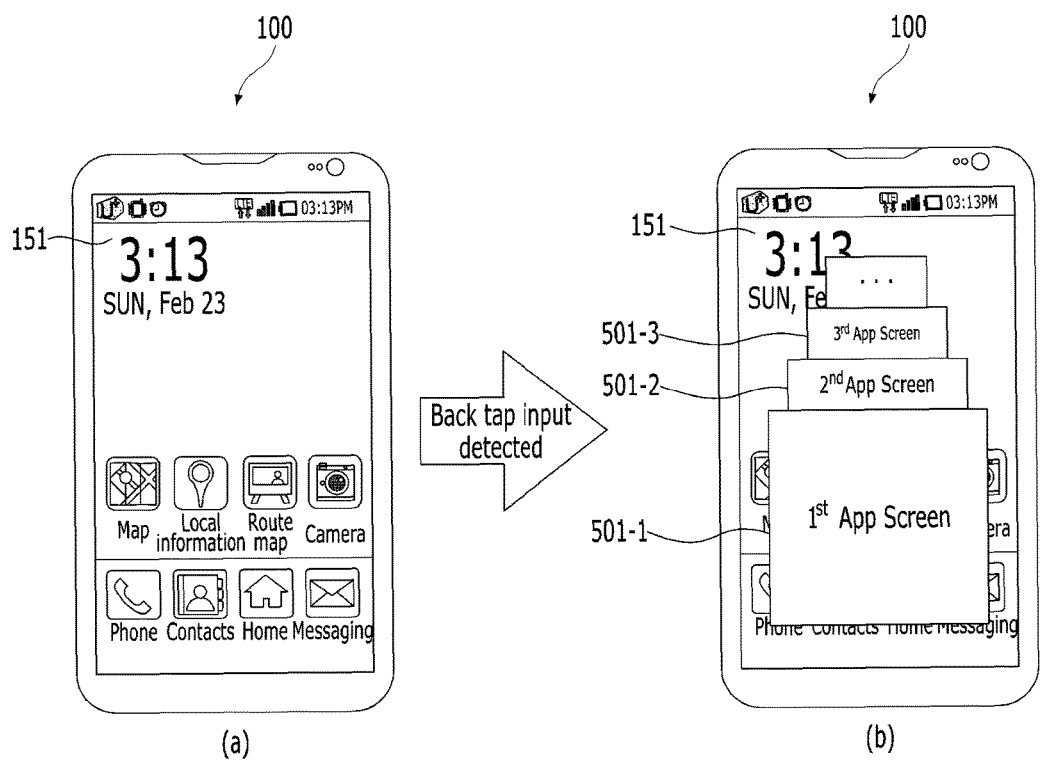
FIG. 5 is a diagram illustrating a method of controlling an execution of a first function of a mobile terminal in response to a back tap input according to one embodiment of the present invention.

In particular, FIG. 5 is a diagram illustrating a method of controlling an execution of a first function of a mobile terminal in response to a back tap input according to one embodiment of the present invention. Referring to FIG. 5(a), a mobile terminal 100 outputs a home screen. Generally, the home screen can be defined as a screen initially displayed on the touchscreen 151 when the touchscreen 151 is unlocked. At least one icon or widget for running an application or an internal function may be displayed on the home screen. At least two home screens may exist in the mobile terminal 100. If a prescribed touch gesture is applied to the touchscreen 151 of the mobile terminal 100 having the at least two home screens, the at least two home screens may be sequentially displayed one by one. And, different icons (or widgets) may be deployed on each of the home screens.

According to one embodiment of the present invention, while an image of the home screen is output (or an execution screen of a different application is output), if a back tap input is detected, the controller 180 can output a list of recently run applications. In particular, items of the application list may include running screens 501-1 to 501-3 of corresponding applications. In addition, outputs of the execution screens can be output stereoscopically with an animation effect of popping out of the touchscreen 151. If a prescribed item is selected by a user from the output application list, the controller 180 runs an application corresponding to the selected item and can output an execution screen to the touchscreen 151.

Figure 6:
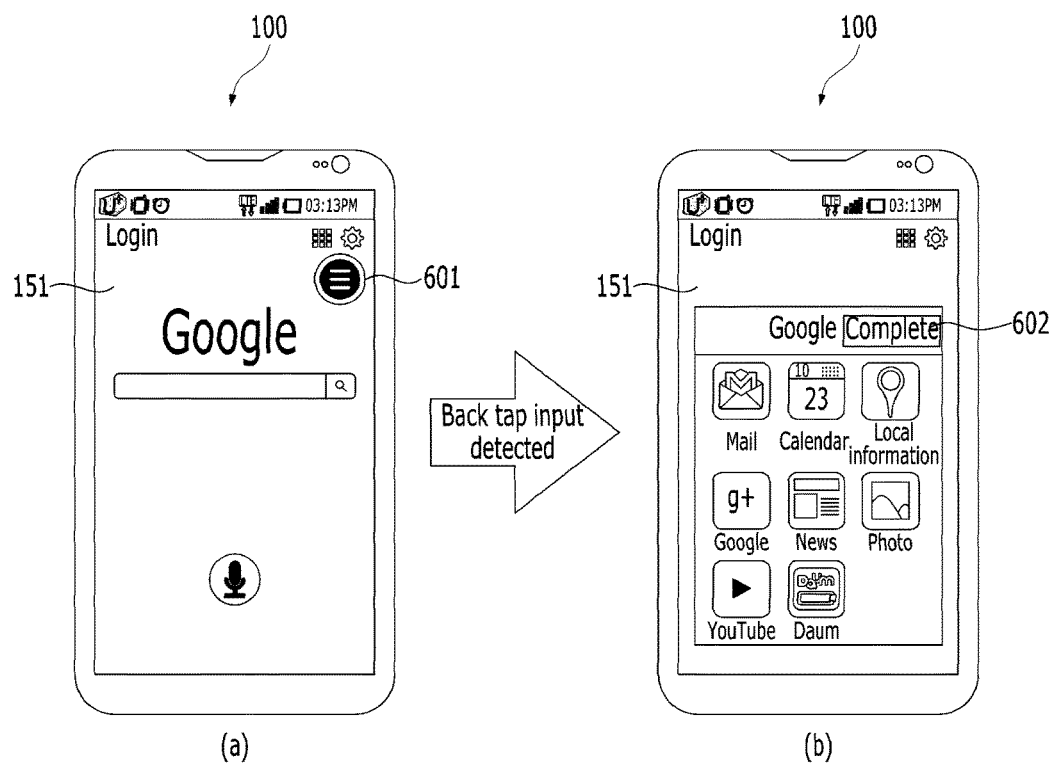
FIG. 6 is a diagram illustrating a method of controlling an execution of a second function of a mobile terminal in response to a back tap input according to one embodiment of the present invention.

FIG. 6 is a diagram illustrating a method of controlling an execution of a second function of a mobile terminal in response to a back tap input according to one embodiment of the present invention. FIG. 6(a) shows a running state diagram of a prescribed application. In the running state diagram, the controller 180 is outputting a menu extension icon 601 to a prescribed region of the touchscreen 151. If an input of selecting the menu extension icon 601 is received, the controller 180 can output a menu run popup window 602 in which at least one run icon is included.

According to one embodiment of the present invention, the menu run popup window 602 is output in response to a back tap input as well as to the above selection input. In particular, while the menu extension icon 601 is displayed, if a back tap input is detected, the controller 180 can output the menu run popup window 602.

Each of the at least one run icon included in the menu run popup window 602 may correspond to a running of a prescribed application or a specific function. In response to an input of selecting each run icon, the controller 180 can run the corresponding application or the corresponding specific function. Moreover, according to one embodiment of the present invention, each run icon of the menu run popup window 602 is a run icon registered by a user. In particular, a function frequently used by a user is registered at the menu run popup window 602 and the menu run popup window 602 is output using a back tap input.

For instance, if a user frequently uses an operation of making a phone call to a specific counterpart, the user can register a function of making a phone call to the specific counterpart at the menu run popup window 602. Moreover, while an execution screen of a different application is output as well as a home screen, if a back tap input is detected, the menu run popup window 602 is output. If a run icon included in the menu run popup window 602 is selected, the user may directly make a phone call to the specific counterpart.

Figure 7:
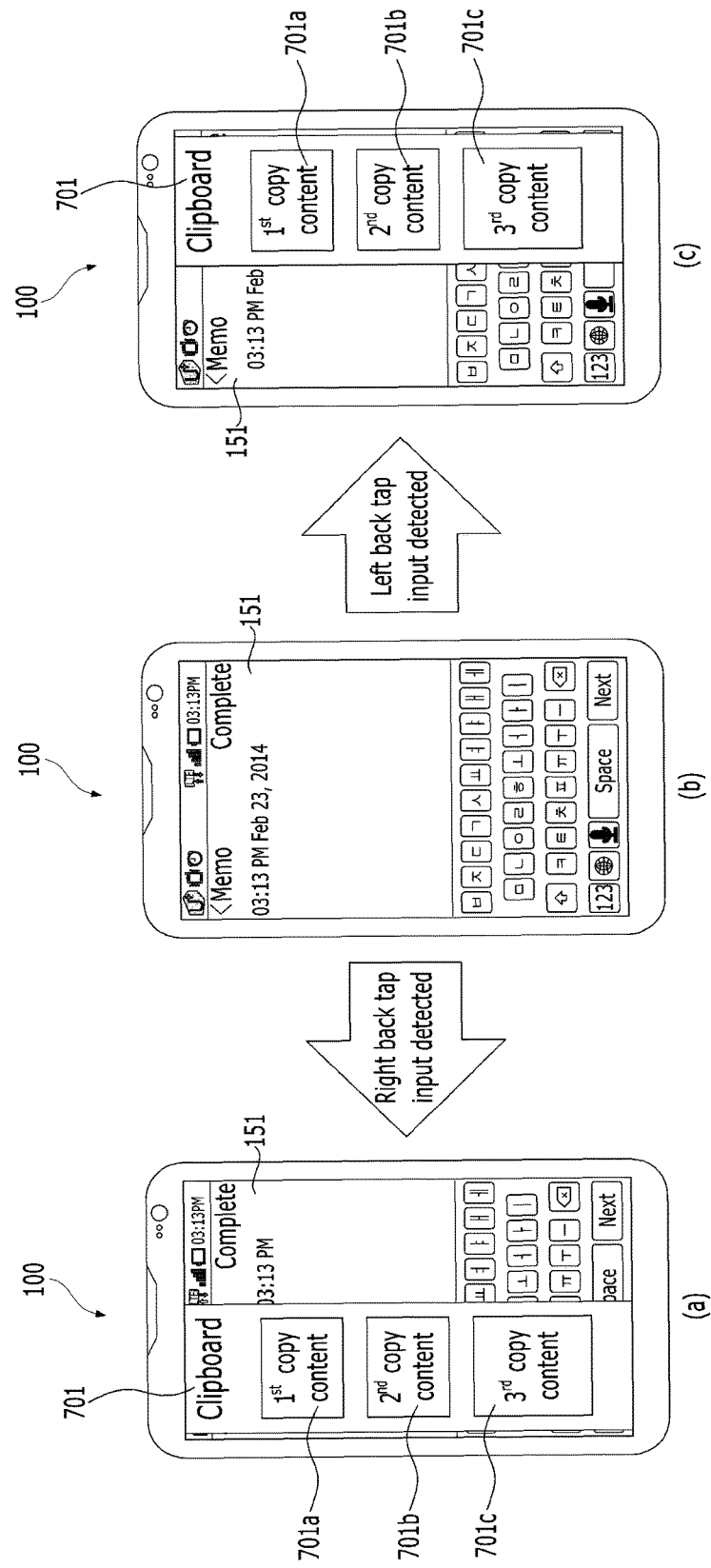
FIG. 7 is a diagram illustrating a method of controlling a third function of a mobile terminal to be run in response to a back tap input according to one embodiment of the present invention.

FIG. 7 is a diagram illustrating a method of controlling a third function of a mobile terminal to be run in response to a back tap input according to one embodiment of the present invention. According to the embodiment of the present invention described with reference to FIG. 7, the run function is an output of a clipboard region. In this instance, a clipboard is a virtual memory region secured to be used as a temporary storage space in copying/pasting data to/on one program (or application) to another program (or application).

According to the embodiment shown in FIG. 7, after a left back tap input and a right back tap input have been distinguished from each other, an output location of a clipboard is adjusted in accordance with the distinguished result. FIG. 7(b) is a diagram of a running state of a memo application. Although an execution screen of a memo application is taken as an example shown in FIG. 7, an embodiment of the present invention may be applicable to any applications capable of utilizing a clipboard.

If a left back tap input is detected, the controller 180 can output a clipboard region 701 to a prescribed region by taking a left side of the touchscreen 151 as a reference. In this instance, the clipboard region 701 is a region for outputting at least one or more content items 701a to 701c saved in the clipboard. If a right back tap input is detected, the controller 180 can output a clipboard region 701 to a prescribed region by taking a right side of the touchscreen 151 as a reference.

Generally, while the mobile terminal 100 is gripped with one hand, when a rear surface of the mobile terminal 100 is tapped, a tapped location may vary depending on the gripping hand. In particular, if the mobile terminal 100 is gripped with a left hand, it may be easy to tap the right side 202b of the rear surface of the mobile terminal 100. On the contrary, if the mobile terminal 100 is gripped with a right hand, it may be easy to tap the left side 202a of the rear surface of the mobile terminal 100.

When the mobile terminal 100 is gripped with the left hand, a range of manipulation with a thumb is determined with reference to a left corner of the touchscreen 151. Hence, it is preferable that manipulation objects are output with reference to a left side. Further, when the mobile terminal 100 is gripped with the right hand, a range of manipulation with a thumb is determined with reference to a right corner of the touchscreen 151. Hence, it is preferable that manipulation objects are output with reference to a right side.

Thus, according to one embodiment of the present invention, a location to which the clipboard region 701 is output is controlled to be changed in response to a tapped location. Meanwhile, it is apparent that the above-described embodiment is applicable in accordance with the distinguishment of the left/right hand back tap input as well as with the distinguishment of the left/right side back tap input.

Figure 8:
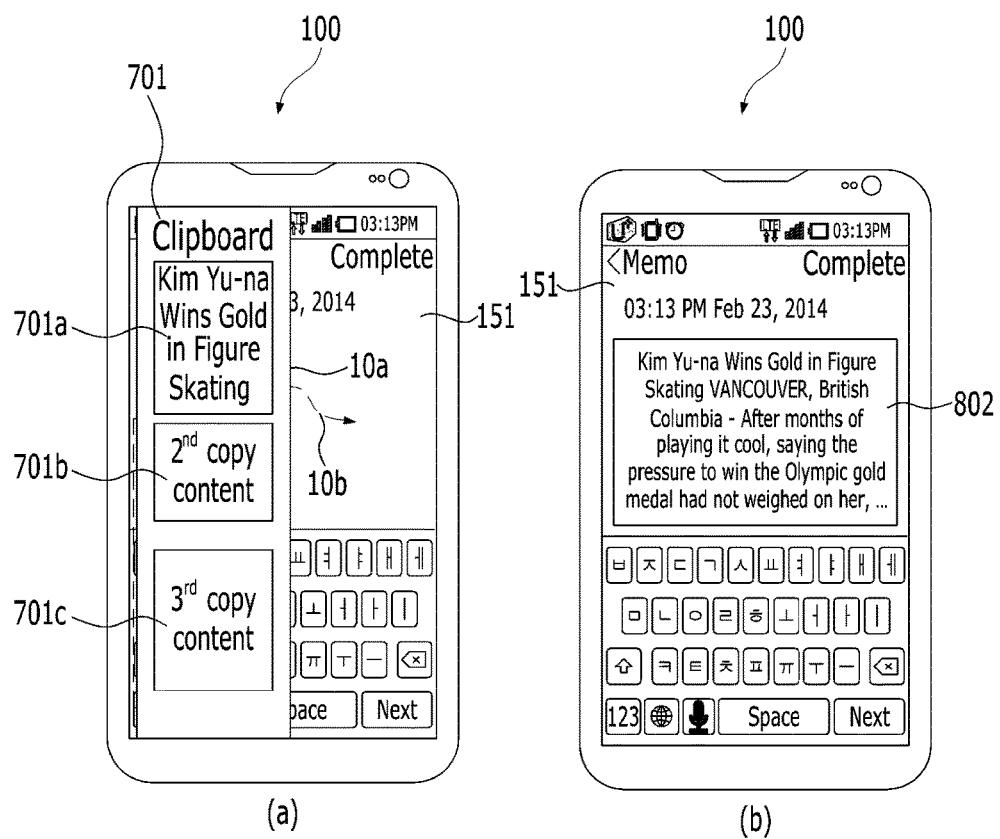
FIG. 8 is a diagram illustrating a method of controlling a content included in a clipboard region to be pasted according to one embodiment of the present invention.

In the following description, a method of performing a paste operation using the clipboard region 701 is explained in detail with reference to FIG. 8. FIG. 8 is a diagram illustrating a method of controlling a content included in a clipboard region to be pasted according to one embodiment of the present invention.

Referring to FIG. 8(a), the aforementioned clipboard region 701 is currently output to a prescribed region of a left reference of the touchscreen 151 together with an execution screen of a memo application. In the clipboard region 701, first to third copy contents 701a to 701c are included. Assume that the first copy content 701a is a text content called 'Kim Yu-Na Wins . . . .'

If a prescribed touch gesture 10a and 10b is input onto the first copy content 701a, the controller 180 can paste the first copy content 701 on the memo application (cf. '802' in FIG. 8(b)). In this instance, 'pasting a text content' may mean that text data included in a text content is input onto an execution screen of a corresponding application. Meanwhile, according to one embodiment of the present invention, in response to a back tap input received during an output of a notification object for notifying a prescribed event, it is proposed to perform a function corresponding to the prescribed event.

According to one embodiment of the present invention, as mentioned in the foregoing description, in order to cope with an intuitive function in response to a back tap input, a function corresponding to a triggered event shall be run. In this instance, since the back tap input is an input of tapping a rear surface of the mobile terminal 100, it can be associated with an action of catching or capturing a thing that is passing instantly. So to speak, while a fishing rod is positioned to catch fish, a back tap input may be associated with an action of lifting the fishing rod as soon as the fish takes a bite. According to one embodiment of the present invention, in response to an occurrence of a prescribed event, the moment a notification object for an occurring prescribed event is instantly displayed, an input of snatching the notification object is provided as a back tap input.

Figure 9:
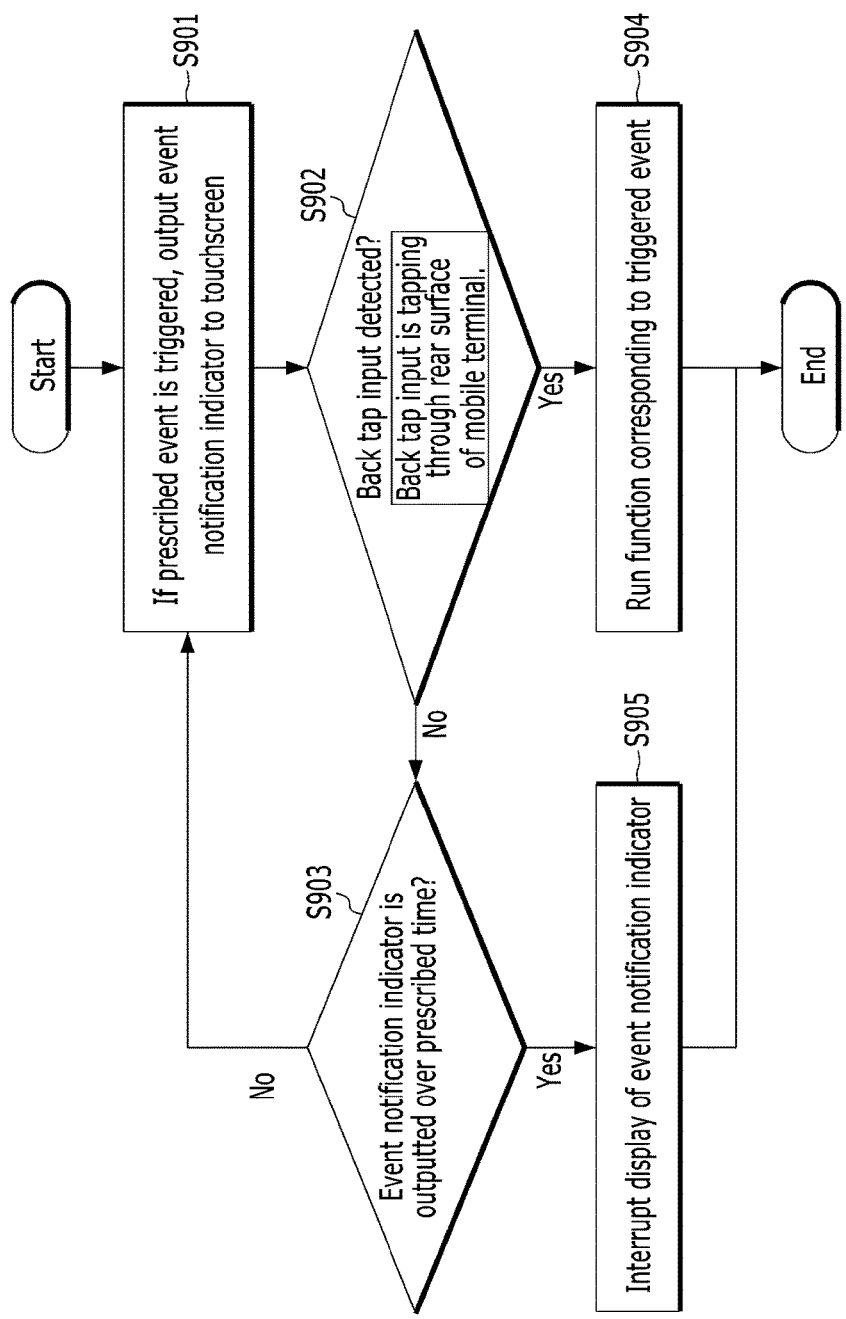
FIG. 9 is a flowchart illustrating a method for executing a function corresponding to a prescribed event in response to a back tap input according to one embodiment of the present invention.
Figure 10:
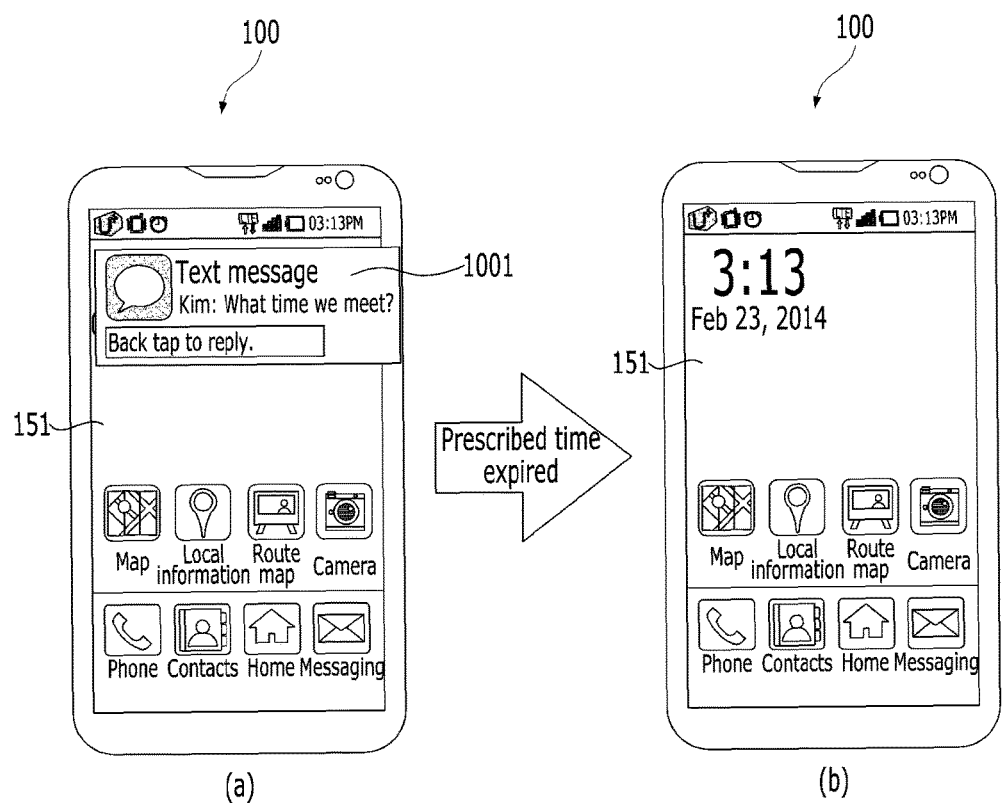
FIG. 10 is a diagram illustrating a method of controlling an output of an event notification indicator according to one embodiment of the present invention.

This controlling method is described in detail with reference to FIGS. 9 to 12 as follows. FIG. 9 is a flowchart illustrating a controlling method for executing a function corresponding to a prescribed event in response to a back tap input according to one embodiment of the present invention. FIG. 10 is a diagram illustrating a method of controlling an output of an event notification indicator according to one embodiment of the present invention. The following description is made with reference to FIG. 9 and FIG. 10.

According to one embodiment of the present invention, as examples of events, there are a text message reception, an arrival of a schedule time, a reception of a call signal, a registration of a post and the like. One embodiment of the present invention may be applicable to an event occurrence for notifying a user.

In a step S901, in response to a prescribed event occurrence, the controller 180 can output an event notification indicator 1001 to the touchscreen 151. Referring to FIG. 10(a), the event notification indicator 1001 can be output to a prescribed region of the touchscreen 151. According to the example shown in FIG. 10(a), the event notification indicator 1001 includes a text reception notification indicator corresponding to an event of a text message reception.

In a step S902, the controller 180 stands by for a reception of a back tap input. If the back tap input is detected, the controller 180 goes to a step S904. If the back tap input is not detected, the controller 180 goes to a step S905. In the step S903, the controller 180 determines whether the event notification indicator has been output over a prescribed time. If the event notification indicator has not been output over the prescribed time, the controller 180 goes back to the step S901. If the event notification indicator has been output over the prescribed time, the controller 180 goes to the step S905.

In the step S905, the controller 180 controls the touchscreen 151 to stop displaying the event notification indicator and ends the routine of the flowchart (cf. FIG. 10(b)). Meanwhile, if the controller 180 detects the back tap input from a user in the step S902, the controller 180 goes to the step S904. This case is described in detail with reference to FIGS. 11 to 13 as follows.

Figure 11:
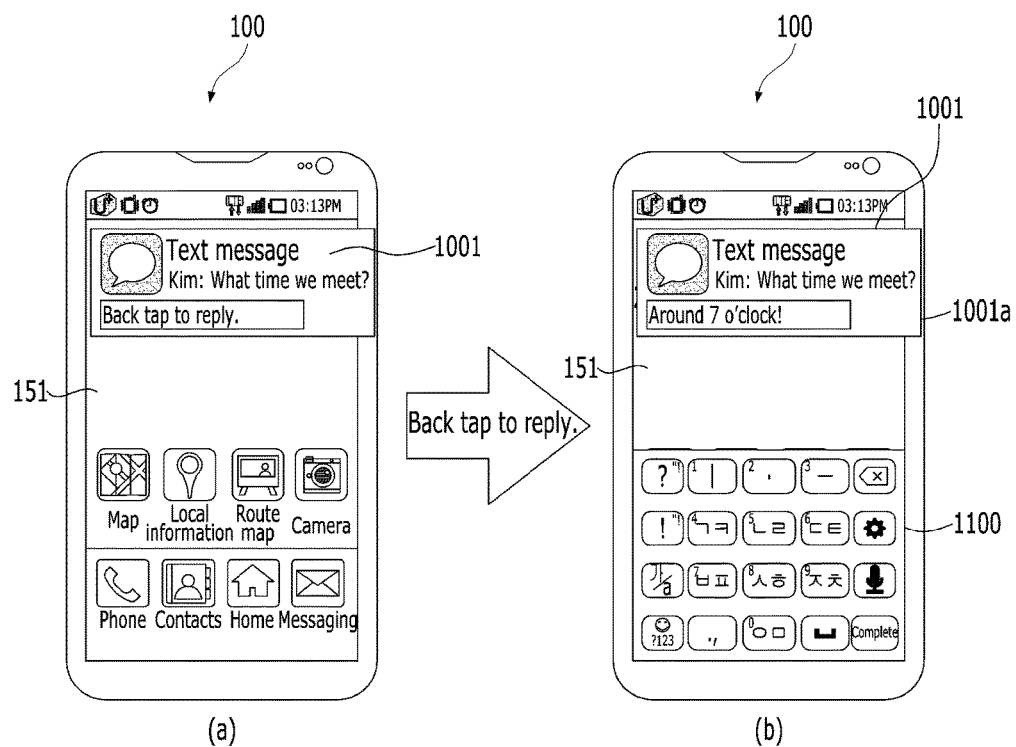
FIG. 11 is a diagram illustrating a method of controlling a prescribed function to be executed in response to a back tap input received during an output of an event notification indicator 1001 according to one embodiment of the present invention.

FIG. 11 is a diagram illustrating a method of controlling a prescribed function to be executed in response to a back tap input received during an output of an event notification indicator 1001 according to one embodiment of the present invention. Referring to FIG. 11(a), as mentioned in the foregoing description with reference to FIG. 10, an event notification indicator 1001 for notifying a text reception event is currently output to a prescribed region of the touchscreen 151. Moreover, as mentioned in the foregoing description with reference to FIG. 10, the controller 180 controls the touchscreen 151 to output the event notification indicator 1001 for a prescribed time only.

According to one embodiment of the present invention, requested is a back tap input for snatching an event notification indicator 1001 temporarily appearing to notify an occurrence of an event. While the event notification indicator 1001 is output, if a back tap input is detected, the controller 180 can run a prescribed function corresponding to the occurring event (S904). According to the example shown in FIG. 11, the occurring event is a reception of a text message and a prescribed function corresponding to the occurring event is a reply compose screen output. In particular, in response to a back tap input received during an output of the event notification indicator 1001 in FIG. 11(a), the controller 180 can output a replay screen (e.g., a message input window 1001a and/or a virtual keypad 1100, etc.) for the text message.

According to the description with reference to FIG. 11, the execution of the function corresponding to the reception of the text message is described. Moreover, the same principle described with reference to FIG. 11 may be applicable to a notification of a text message reception corresponding to a notification received from an SNS (social network service) application and/or a notification of a posting registration.

Figure 12:
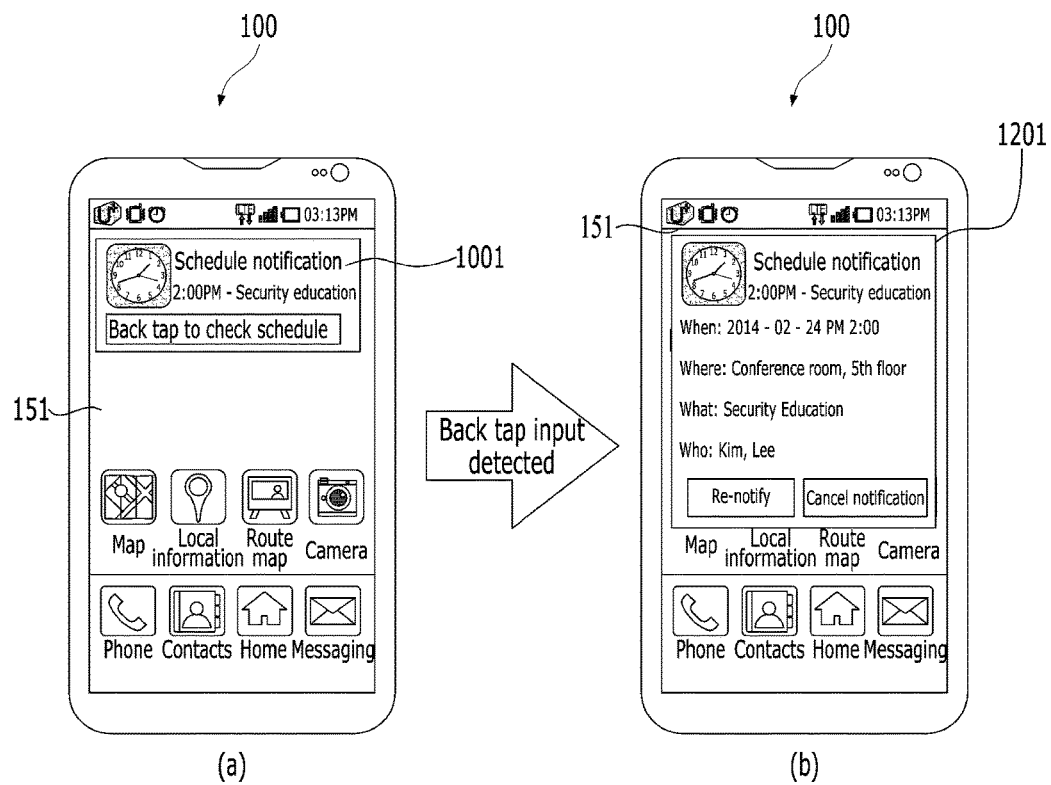
FIG. 12 is a diagram illustrating a method of controlling a function to be executed in response to an occurrence of a schedule notification event according to one embodiment of the present invention.

The occurring event in the embodiment described with reference to FIG. 11 is the reception of the text message. An occurrence of a schedule notification event is described in detail with reference to FIG. 12 as follows. FIG. 12 is a diagram illustrating a method of controlling a function to be executed in response to an occurrence of a schedule notification event according to one embodiment of the present invention.

Referring to FIG. 12(a), in response to an occurrence of a schedule notification event, the controller 180 outputs an event notification indicator 1001 to a prescribed region of the touchscreen 151. In this instance, the event notification indicator 1001 includes guidance words indicating that a back tap input is requested to read sub-items.

While the event notification indicator 1001 is output, if a back tap input from a user is detected, the controller 180 can run a prescribed function (e.g., a display of details 1201 of a schedule) corresponding to the occurring schedule notification event. Moreover, according to one embodiment of the present invention, while the details 1201 of the schedule are displayed, if a back tap input is detected again, the controller 180 can execute one of a snooze and an alarm cancellation for the schedule notification event. In the following description, a function executed or run in response to a phone call reception event is explained with reference to FIG. 13.

Figure 13:
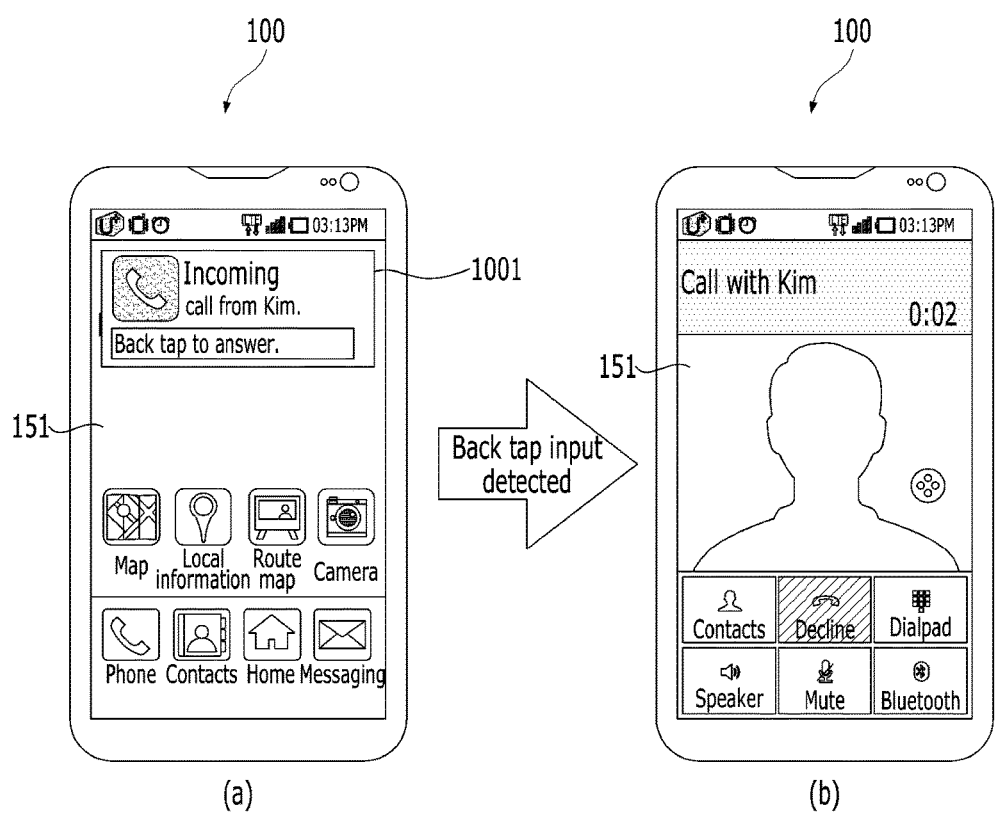
FIG. 13 is a diagram illustrating a method of controlling a function to be executed in response to a phone call reception event according to one embodiment of the present invention.

FIG. 13 is a diagram illustrating a method of controlling a function to be executed in response to a phone call reception event according to one embodiment of the present invention. Referring to FIG. 13(a), an event notification indicator 1001 can be output to a prescribed region of the touchscreen 151 in response to a phone call reception event. In this instance, the event notification indicator 1001 may include information on a phone call counterpart and/or guidance words indicating that a phone call can be received using a back tap input.

As mentioned in the foregoing description, the output of the event notification indicator 1001 can be maintained on the touchscreen 151 for a prescribed time only after the occurrence of the event. Referring to the example shown in FIG. 13(a), if a reception of a back tap input is detected during an output of the event notification indicator 1001, the controller 180 can respond to a received phone call (cf. FIG. 13(b)).

Meanwhile, according to embodiments of the present invention mentioned in the following description, a controlling method is provided for extending a use region of a main display 151-1 widely by utilizing a region of an auxiliary display 151-2. Prior to the description of one embodiment of the present invention, an indicator region shall be described in detail with reference to FIG. 14 as follows.

Figure 14:
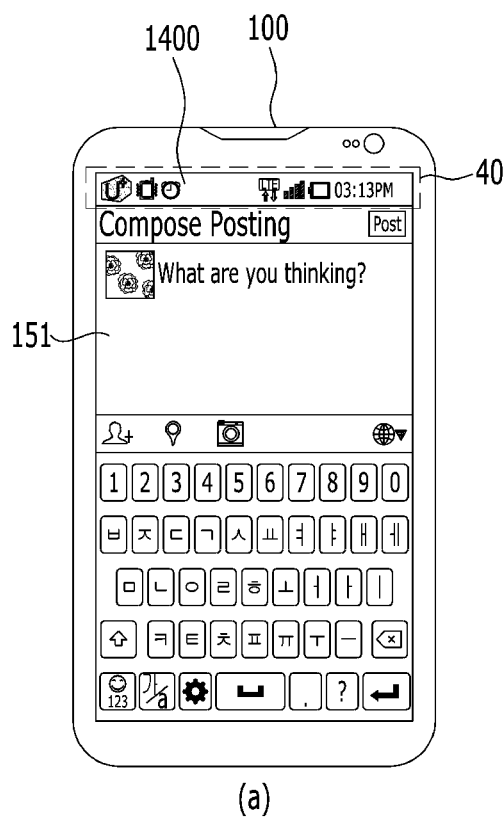
FIG. 14 is a diagram illustrating an indicator and an indicator region including at least one indicator.

FIG. 14 is a diagram illustrating an indicator and an indicator region including at least one indicator. Referring to FIG. 14(a), an indicator region 1400 means a region displayed on a predetermined region 40 of the display unit 151 all the time except displaying a prescribed application, which uses a full screen, for performing a function of displaying various operating states (e.g., current hour, battery state, radio signal reception strength, etc.) of a mobile terminal in prescribed forms. It can display each of the operating states using an individual indicator. Generally, the indicator region 1400 is located at a top end portion of the display unit 151. Since the indicator region 1400 located at the top end portion is displayed by being fixed to a prescribed portion of the main display 151-1, some limitations are put on the main display 151-1.

FIG. 14(b) is a diagram illustrating one example of individual indicators illustrated in a table form. Referring to FIG. 14(b), a first indicator 1401a is an indicator indicating a trademark of a communication service provider and indicates a communication service provider in which the mobile terminal 100 is currently subscribed. A second indicator 1401b is an indicator indicating sound/vibration settings currently set in the mobile terminal 100. A third indicator 1401c is an alarm indicator and is displayed when a presence of an alarm set in the mobile terminal 100. A fourth indicator 1401d is an indicator indicating a data communication and can identifiably display an upload/download state for data packets. A fifth indicator 1401e indicates a strength of a wireless transceived signal of the mobile terminal 100. A $6^{th}$ indicator 1401f indicates a remaining level of a battery of the mobile terminal 100. And, a seventh indicator 1401g indicates a current hour.

Meanwhile, the above-mentioned types of indicators are exemplary only, by which the embodiments of the present invention are non-limited. Meanwhile, there are various kinds of indicators including an indicator displayed all the time, an indicator displayed under a specific condition only, and the like. For instance, the third indicator 1401c indicating an alarm is displayed only if a set alarm exists. Further, the seventh indicator 1401g indicating a current hour can be displayed all the time. Subsequently, a controlling method for outputting the indicator region 1400 to the auxiliary display 151-2 is described in detail with reference to FIG. 15 as follows.

Figure 15:
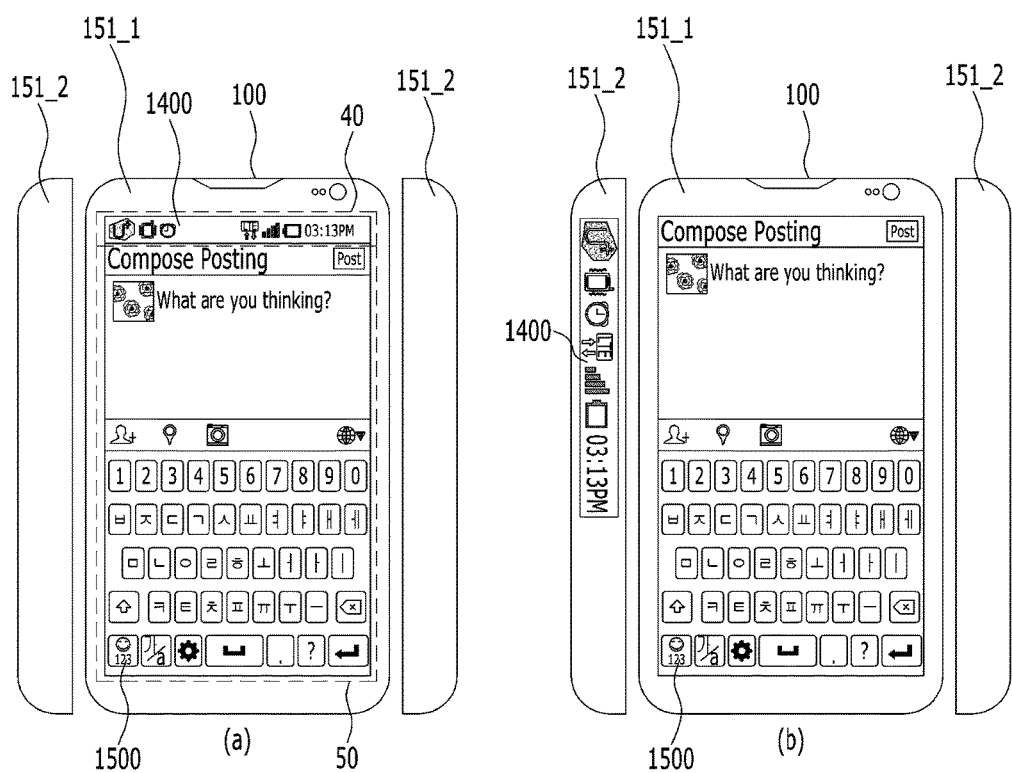
FIG. 15 is a diagram illustrating a method of controlling an indicator region 1400 to be output by being moved to an auxiliary display 151-2 according to one embodiment of the present invention.

FIG. 15 is a diagram illustrating a method of controlling an indicator region 1400 to be output by being moved to an auxiliary display 151-2 according to one embodiment of the present invention. Referring to FIG. 15(a) and FIG. 15(b), a state diagram of a mobile terminal 100 according to one embodiment of the present invention is illustrated. This state diagram includes a state diagram of an auxiliary display 151-2 as well as a state diagram of a main display 151-1.

In the state diagram shown in FIG. 15(a), the mobile terminal 100 currently outputs an execution screen 1500 of an application to a first region 50 through the main display 151-1. In addition, the controller 180 currently outputs an indicator region 1400 to another predetermined region (e.g., a second region) 40 of the main display 151-1. If receiving a command (hereinafter named an indicator move command) for moving the indicator region 1400 to the auxiliary display 151-2, referring to FIG. 15(b), the controller 180 can output the indicator region 1400 to the auxiliary display 151-2.

Moreover, while the controller 180 outputs the indicator region 1400 to the auxiliary display 151-2, the controller 180 can extend and output the execution screen 1500 of the application instead of outputting the indicator region 1400 to the main display 151-1 previously. In particular, the region of the main display 151-1 limited previously due to the output of the indicator region 1400 can be extended and used as a region for outputting the execution screen 1500 of the application.

Figure 16A:
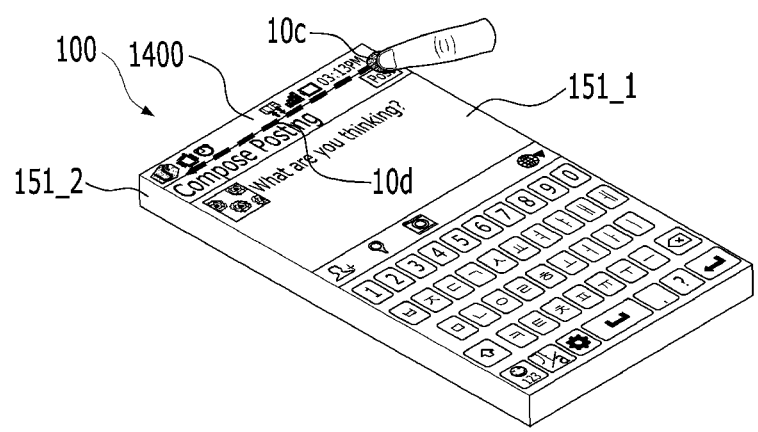
FIG. 16A and FIG. 16B are perspective diagrams illustrating one example of an indicator moving command according to one embodiment of the present invention.
Figure 16B:
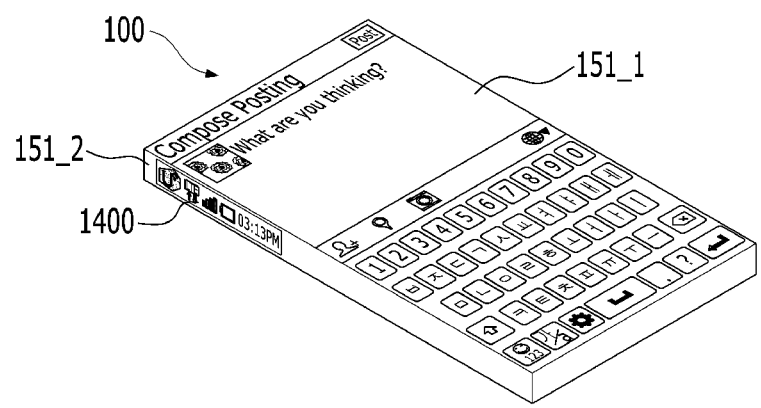

One example of the indicator move command is described in detail with reference to FIG. 16A and FIG. 16B as follows. In particular, FIG. 16A and FIG. 16B are perspective diagrams illustrating one example of an indicator moving command according to one embodiment of the present invention. In a state diagram shown in FIG. 16A, the mobile terminal 100 currently outputs both an indicator region 1400 and an execution screen 1500 of an application through a main display 151-1.

Referring to FIG. 16A, an indicator move command may include an input performed by applying a touch to one point of an indicator region 1400 and then applying a drag 10d to another point on the indicator region 1400 by maintaining the touch 10c. Moreover, the controller 180 can select an output auxiliary display 151-2 depending on a drag direction. As mentioned in the foregoing description, the auxiliary display 151-2 may be provided to both sides of the main display 151-1. If the drag direction is a left direction of the main display 151-1 (FIG. 16A), the controller 180 can output the indicator region 1400 to the left auxiliary display 151-2 (FIG. 16B).

Meanwhile, another example of the indicator move command may include a back tap input. If a back tap input is detected, the controller 180 moves and outputs the indicator region 1400, which has been output to the main display 151-1, to the auxiliary display 151-2. In addition, the controller 180 distinguishes a left back tap input and a right back tap input from each other. If the left back tap input is detected, the controller 180 can output the indicator region 1400 to the left auxiliary display 151-2. If the right back tap input is detected, the controller 180 can output the indicator region 1400 to the right auxiliary display 151-2.

According to the embodiment mentioned in the above description, the whole indicators displayed on the indicator region 1400 are output to one of the auxiliary displays 151-2. According to one embodiment of the present invention, since the auxiliary displays 151-2 can be provided to both sides of the main display 151-1, respectively, a controlling method of outputting indicators included in the indicator region 1400 to two auxiliary display regions by sorting the indicators by a prescribed reference is provided.

Figure 18:
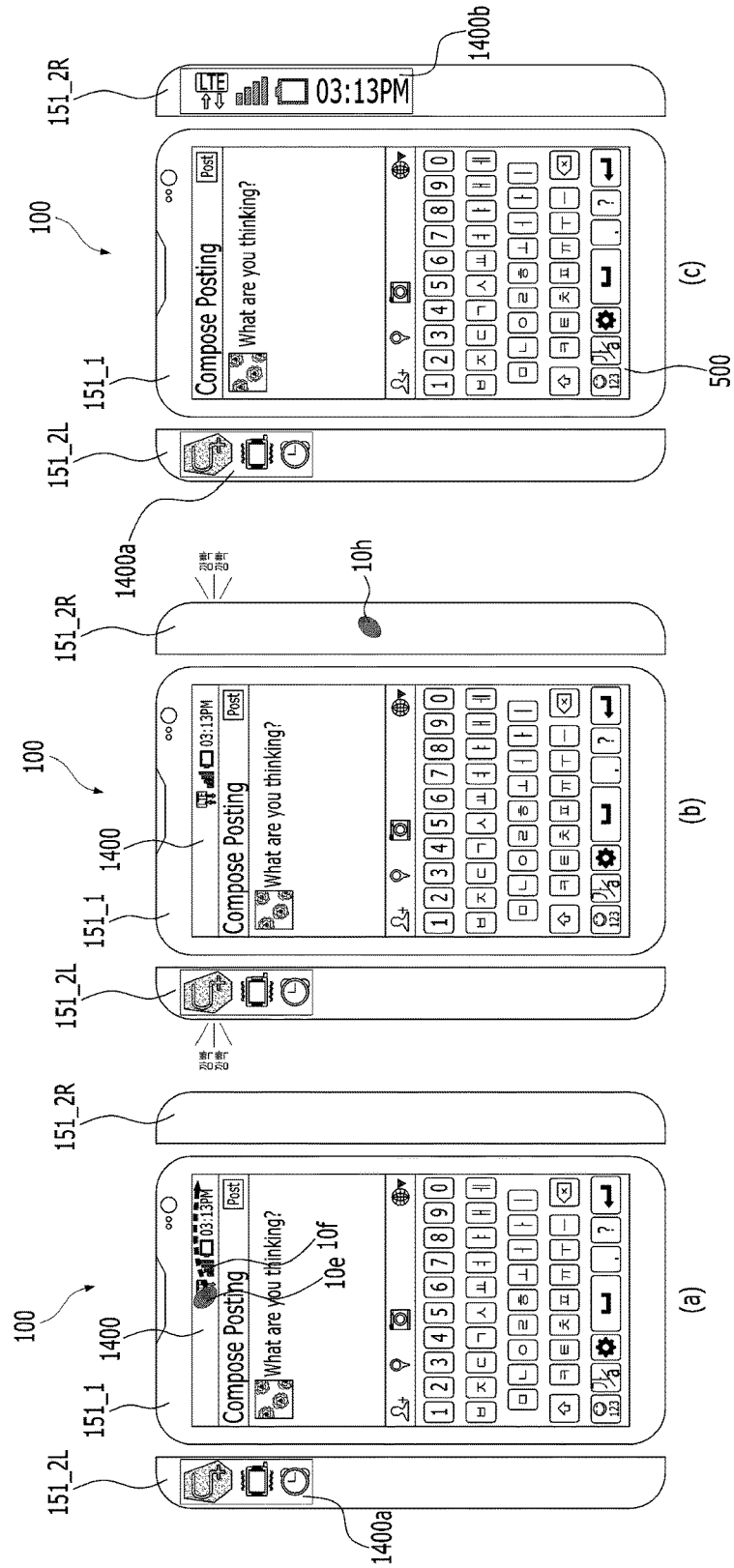
Figure 19:
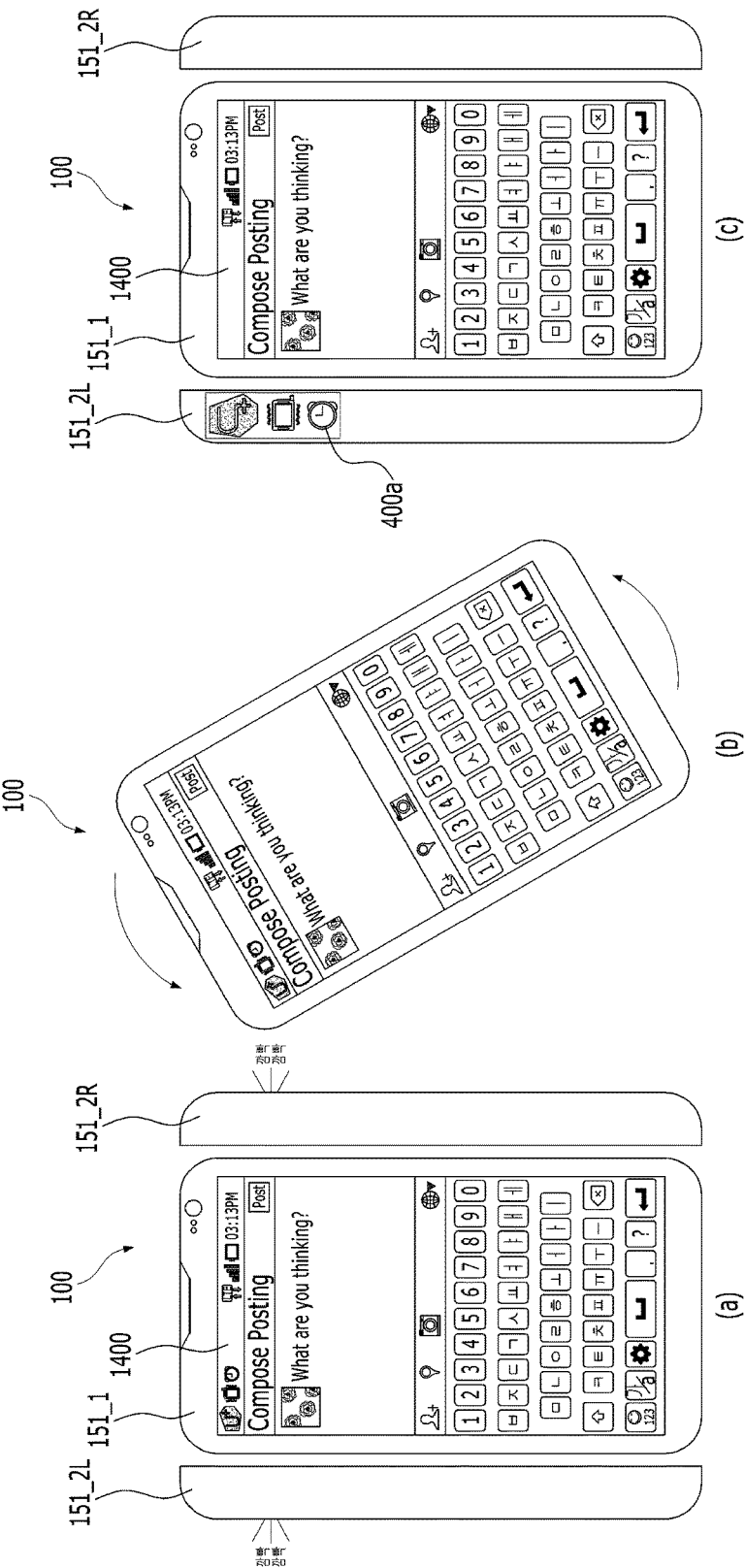

FIGS. 17 to 19 are diagrams illustrating a method of distinguishing and outputting an indicator region based on a user's indicator move command according to an embodiment of the present invention, respectively. In the following description, according to an embodiment for distinguishing a left auxiliary display and a right auxiliary display from each other, the left auxiliary display shall be denoted by a reference number 151-2L and the right auxiliary display shall be denoted by a reference number 151-2R.

In a state diagram shown in FIG. 17(*a*), the mobile terminal 100 currently outputs both an indicator region 1400 and an execution screen 1500 of an application through a main display 151-1. If at least one indicator is selected and an input of selecting one 151-2 of a left auxiliary display and a right auxiliary display is received, the controller 180 can output the selected at least one indicator to the selected auxiliary display 151-2.

The aforementioned input of selecting an indicator may include a touch drag input 10*e* and 10*f* applied to an indicator to select. In particular, if the input performed by applying the touch 10*e* and then applying the drag 10*f* by maintaining the touch 10*e* is received from a user, the controller 180 can select the indicator displayed at a location resulting from the touch 10*e* and the drag 10*f*.

The input of selecting the auxiliary display 151-2 may include an input of touching one of the auxiliary displays 151-2. According to the example shown in FIG. 17, a user intends to select first to third indicators 1401*a* to 1401*c*. If an input performed by applying a touch 10*e* to the first indicator 1401*a* and then applying a drag 10*f* to the third indicator 1401*c* by maintaining the touch 10*e* is received, the controller 180 can select the first to third indicators 1401*a* to 1401*c*.

Once the first to third indicators 1401*a* to 1401*c* are selected, the controller 180 180 can output an indicator indicating that the auxiliary display 151-2 is selectable. Further, referring to FIG. 17(*b*), the auxiliary display can be blinked. If a left auxiliary display 151-2L is selected, referring to FIG. 17(*c*), the controller 180 can display a first indicator region 1400*a* including the selected first to third indicators 1401*a* to 1401*c* on the left auxiliary display 151-2L.

Subsequently, referring to FIG. 18(*a*), if an input performed by applying a touch 10*f* to the fourth indicator 1401*d* and then applying a drag 10*g* to the seventh indicator 1401*g* by maintaining the touch 10*f* is received, the controller 180 can select the fourth to seventh indicators 1401*d* to 1401*g*. Once the fourth to seventh indicators 1401*d* to 1401*g* are selected, the controller 180 can output an indicator indicating that the auxiliary display 151-2 is selectable. Further, referring to FIG. 18(*b*), the auxiliary display can be blinked.

If a right auxiliary display 151-2R is selected, referring to FIG. 18(*c*), the controller 180 can display a second indicator region 1400*b* including the selected fourth to seventh indicators 1401*d* to 1401*g* on the right auxiliary display 151-2R. According to the embodiment described with reference to FIG. 17 and FIG. 18, as the first indicator region 1400*a* and the second indicator region 1400*b* are output to the left auxiliary display 151-2L and the right auxiliary display 151-2R, respectively, an application running screen 1500 can be output to a wider region shown in FIG. 18(*c*).

According to the embodiment described with reference to FIG. 17 and FIG. 18, it is proposed that an input of touching one of the left auxiliary display 151-2L and the right auxiliary display 151-2R is selected as the input for selecting the left/right auxiliary display 151-2. In FIG. 19, a controlling method for selecting the auxiliary display by detecting an inclination of the mobile terminal 100 is further proposed.

FIG. 19 is a diagram illustrating selecting one of auxiliary displays 151-2 according to one embodiment of the present invention. According to the embodiment described with reference to FIG. 19, an inclination of the mobile terminal 100 is detected and an auxiliary display 151-2 is selected in response to the detected inclination.

Referring to FIG. 19(*a*), like the example shown in FIG. 17, the first to third indicators 1401*a* to 1401*c* are selected. The controller 180 can control a selectable auxiliary display 151-2 to be displayed by being blinked. Referring to FIG. 19(*b*), if the controller 180 detects an inclination in a left direction, the controller 180 selects a left auxiliary display 151-2L and can output a first indicator region 1400*a* including the selected first to third indicators 1401*a* to 1401*c* to the left auxiliary display 151-2L.

Meanwhile, according to the above-described embodiment, the indicator region 1400 is output to the auxiliary display 151-2 by which another embodiment of the present invention is non-limited. In particular, according to another embodiment of the present invention, the indicator region 1400 is output to other output regions. In this instance, other output regions may include an address input window region and a search window region when a web browser application. Such embodiment shall be described in detail with reference to FIG. 20 as follows.

Figure 20:
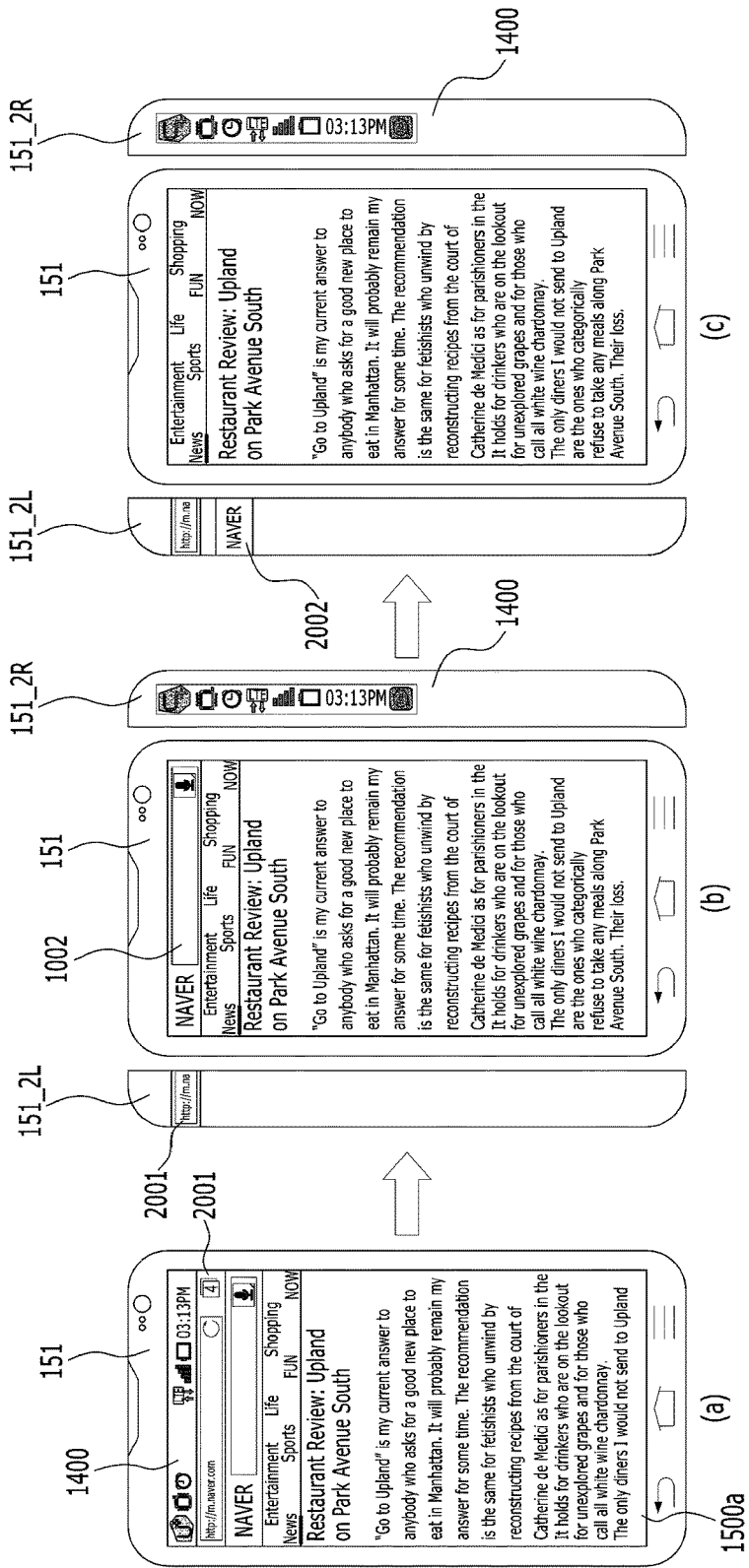
FIG. 20 is a diagram illustrating a method of controlling an address input window region and a search window region to be output by being moved to an auxiliary display according to one embodiment of the present invention.

FIG. 20 is a diagram illustrating a method of controlling an address input window region and a search window region to be output by being moved to an auxiliary display according to one embodiment of the present invention. Referring to FIG. 20(*a*), the mobile terminal 100 displays an execution screen (hereinafter named a web running screen) 1500*a* of a web browser application, an indicator region 1400, an address input window 2001, and a search window 2002.

As mentioned in the foregoing description with reference to FIGS. 15 to 19, in response to an indicator move command, the indicator region 1400 can be displayed on a right auxiliary display 151-2R. Moreover, if an address input window move command is received, referring to FIG. 20(*b*), the controller 180 can output the address window 1001 to the auxiliary display 151-2. If a search window move command is received, referring to FIG. 20(*c*), the controller 180 can output the search window 2002 to the auxiliary display 151-2.

According to one embodiment of the present invention, the address input window move command may include a back tap input. In particular, if a back tap input is received, referring to FIG. 20(*c*), the controller 180 can output the address window 1001 to the auxiliary display 151-2. Meanwhile, according to another embodiment of the present invention, a method of outputting a message notification indicator is provided as another method of utilizing an auxiliary display 151-2. This embodiment is described in detail with reference to FIG. 21 as follows.

Figure 21:
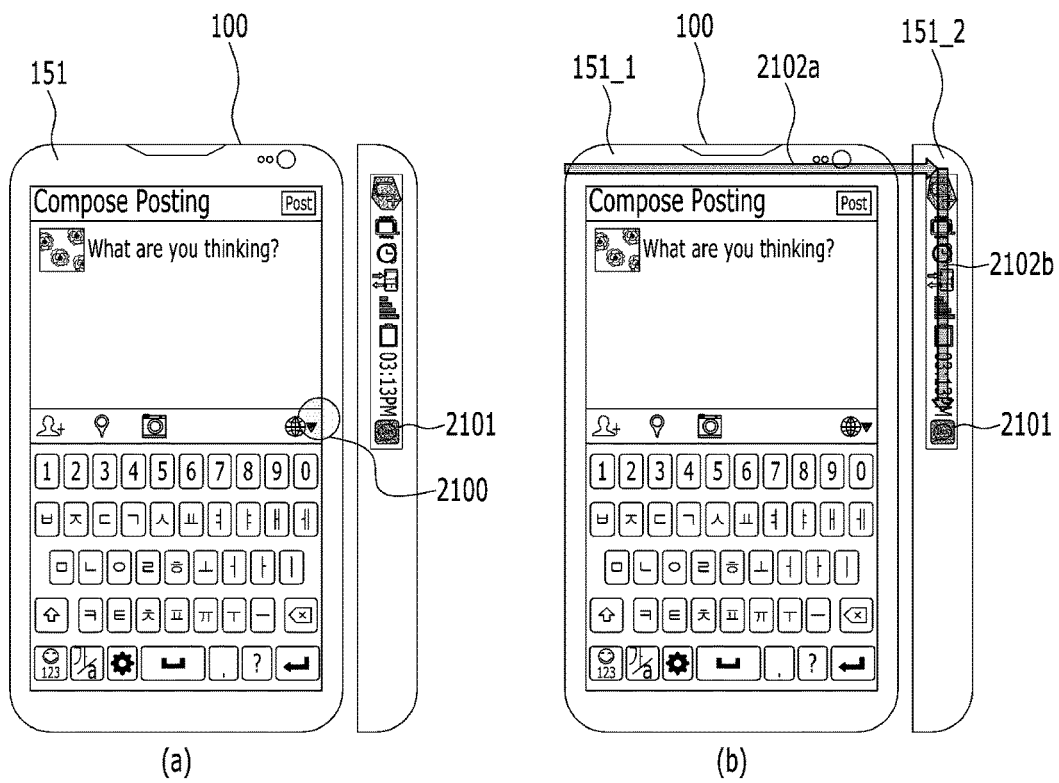
FIG. 21 is a diagram illustrating a method of controlling a message notification indicator 2101 to be output to an auxiliary display 151-2 according to one embodiment of the present invention.

FIG. 21 is a diagram illustrating a method of controlling a message notification indicator 2101 to be output to an auxiliary display 151-2 according to one embodiment of the present invention. Referring to FIG. 21, for a text message transceiving application, when a text message received from a chat counterpart is present, a user can be informed of a presence of the received text message in various ways. For instance, when a text message is received, a voice notification or a notification popup window can be output. According to one embodiment of the present invention, the controller 180 outputs a notification indicator 2101 to an auxiliary display 151-2 and further outputs an auxiliary indicator 2100 configured to assist the notification indicator 2101.

Generally, the auxiliary display 151-2 may not provide a clean front view, because the auxiliary display 151-2 is provided to a lateral surface of the mobile terminal 100. Hence, according to one embodiment of the present invention, if a text notification indicator 2101 output to the auxiliary display 151-2 is present, the auxiliary indicator 2100 configured to notify the presence of the text notification indicator 2010 is output to a main display 151-1. In this instance, the auxiliary indicator 2100 is displayed on the main display 151-1, as shown in FIG. 21(*a*), and more particularly, at a location corresponding to that of the text notification indicator 2101.

According to another embodiment of the present invention, an animation effect of the text notification indicator 2101 is provided instead of an output of the auxiliary indicator 2100. Referring to FIG. 21(*b*), if a text message is received, the controller 180 can give an animation effect, which is provided as if the text notification indicator 2101 moves from the main display 151-1 to the auxiliary display 151-2 through prescribed paths 2102*a* and 2102*b*, in outputting the text notification indicator 2101. Such an animation effect may inform a user that the text notification indicator 2101 is output.

Figure 22:
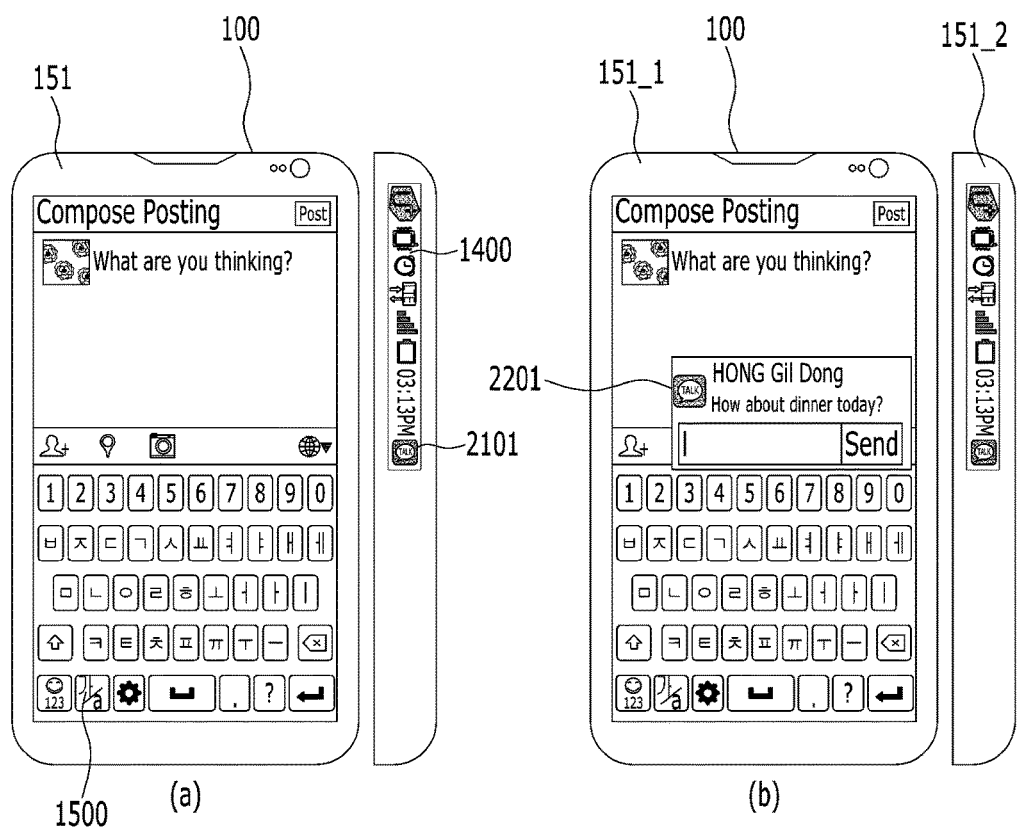
FIG. 22 is a diagram illustrating a method of controlling a text notification indicator to be utilized according to one embodiment of the present invention.

FIG. 22 is a diagram illustrating a method for utilizing a text notification indicator to according to one embodiment of the present invention. Referring to FIG. 22(*a*), the mobile terminal 100 currently outputs an execution screen 1500 of an application through a main display 151-1 and also outputs an indicator region 1400 through an auxiliary display 151-2. In addition, a text notification indicator 2101 is output to the indicator region 1400.

If an input of selecting the text notification indicator 2101 is received, referring to FIG. 22(*b*), the controller 180 can display a reception popup window 2201 including a received text message on the main display 151-1. A user checks the received text message through the reception popup window 2201 and can also compose a reply through the reception popup window 2201.

In this instance, the input for selecting the text notification indicator 2101 may include an input of touching the text notification indicator 2101 itself. Moreover, according to one embodiment of the present invention, the text notification indicator 2101 can be selected through a back tap input. In particular, while the text notification indicator 2101 is displayed, if a back tap input is received, the controller 180 can output a reception popup window 2201 for outputting a received text message through the main display 151-1.

Furthermore, according to one embodiment of the present invention, the text notification indicator 2101 is selected in response to a back tap input corresponding to a location for displaying the text notification indicator 2101 by distinguishing a left/right back tap input. Referring to FIG. 22(*a*), when the text notification indicator 2101 is displayed on a right auxiliary display 151-2, the text notification indicator 2101 may be selected in response to the right back tap input.

Likewise, a user checks the received text message through the reception popup window 2201 and can also compose a reply through the reception popup window 2201. When outputting an indicator region 1400 to a top end, a curtain call menu (e.g., a curtain call user menu, a quick panel, a notification bar/drawer, etc.) is paged from the top end indicator region 1400. According to one embodiment of the present invention mentioned in the foregoing description, when an indicator region is output to an auxiliary display 151-2, the curtain call menu is paged from the auxiliary display. Such an embodiment shall be described in detail with reference to FIG. 23 as follows.

Figure 23:
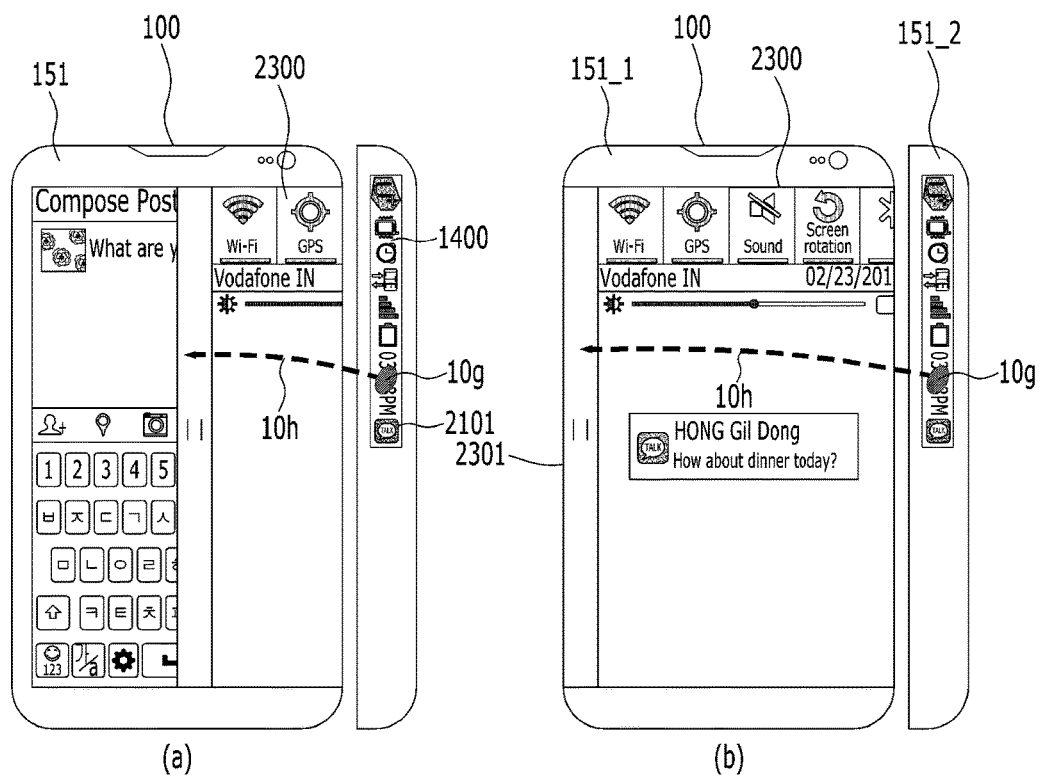
FIG. 23 is a diagram illustrating a method of controlling a curtain call menu to be paged from an indicator region 1400 currently output through an auxiliary display 151-2 according to one embodiment of the present invention.

FIG. 23 is a diagram illustrating a method of controlling a curtain call menu to be paged from an indicator region 1400 currently output through an auxiliary display 151-2 according to one embodiment of the present invention. First of all, a curtain call menu means a menu screen for displaying at least one icon for facilitating an access to a system setup frequently used by a user or displaying several notifications to a user. Generally, when the indicator region 1400 is displayed on a top end of a main display 151-1, it can page the curtain call menu in response to an input performed by applying a touch to the indicator region 1400 and then applying a drag in a bottom direction by maintaining the touch.

According to one embodiment of the present invention, when the indicator region 1400 is displayed on an auxiliary display 151-2 by being moved thereto, the curtain call menu is paged from the auxiliary display 151-2 to which the indicator region 1400 is currently output.

Referring to FIG. 23(*a*), the controller 180 currently outputs an indicator region 1400 through a right auxiliary display 151-2. If an input of a touch 10*g* to the indicator region 1400 is received and a drag 10*h* to a main display 151-1 by maintaining the touch 10*g* is then applied, the controller 180 can output a curtain call menu 2300 (FIG. 23(*a*), FIG. 23(*b*)). In this instance, the output curtain call menu 2300 can be displayed like opening a drawer by appearing gradually from a right side of the main display 151-1 in accordance with a location of the drag 10*h* and touch 10*g*.

Referring to FIG. 23(*b*), the curtain call menu 2300 can display a detailed notification 2301 corresponding to a text notification indicator 2101. In this instance, the detailed notification 2301 may include at least one of a sender counterpart of a received text and a detailed content of the received text. And, the controller 180 can perform a reply function in response to an input of selecting the detailed notification 2301.

Figure 24:
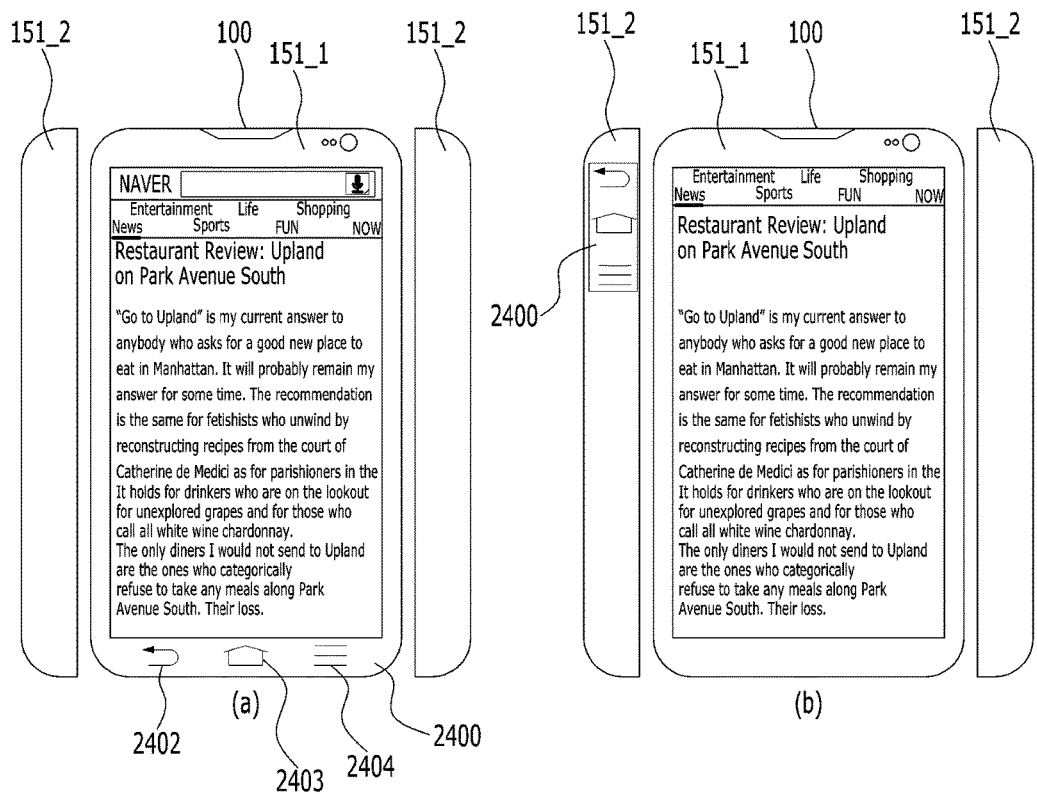
FIG. 24 is a diagram illustrating a method of controlling at least one function button output to a main display 151-1 to be output to an auxiliary display according to one embodiment of the present invention.
Figure 25:
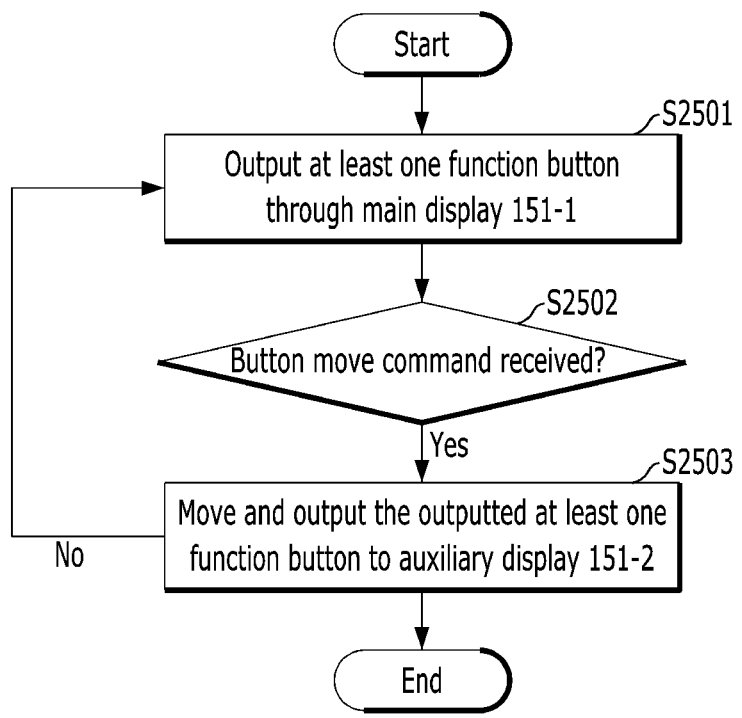
FIG. 25 is a flowchart illustrating outputting at least one function button output through a main display 151-1 to an auxiliary display according to one embodiment of the present invention.

According to another embodiment of the present invention, at least one function button output to a main display 151-1 is output to an auxiliary display 151-2. Such an embodiment shall be described in detail with reference to FIG. 24 as follows. FIG. 24 is a diagram illustrating a method of controlling at least one function button output to a main display 151-1 to be output to an auxiliary display according to one embodiment of the present invention. FIG. 25 is a flowchart of outputting at least one function button output through a main display 151-1 to an auxiliary display according to one embodiment of the present invention. The following description is made with reference to FIG. 24 and FIG. 25 both.

Referring to FIG. 24(*a*), according to one embodiment of the present invention, the controller 180 can output first to third buttons 2402 to 2404 to a prescribed button region 2400 of a main display 151-1. If a prescribed one of the first to third buttons 2402 to 2404 is selected by being touched, the controller 180 can run a function corresponding to the selected button (S2501).

In this instance, the first button 2402 is the button for returning (or cancelling) a most recently executed user command. In particular, if an input of selecting the first button 2402 is received, the controller 180 can cancel a most recently run function in response to a user's command. The second button 2403 is the button for outputting a home screen 201. Hence, while an execution screen of a prescribed application is output, if an input of selecting the second button 2402 is received, the controller 180 interrupts the output running screen of the application and can output the home screen 201. Further, while the home screen 201 is output, if an input of selecting the second button 2402 is received, the controller 180 can not perform any operations.

The third button 2404 is the button for outputting a menu list. If an input of selecting the third button 2404 is received, the controller 180 outputs a prescribed menu list and can receive a selection of a menu item from a user. Meanwhile, the above-described function buttons are just exemplary, by which function button types of embodiments of the present invention are non-limited.

In a step s2502, the controller 180 stands by for a reception of a button move command. If the button move command is received, referring to FIG. 24(b), the output function buttons can be output by being moved to the auxiliary display 151-2 (S2503). If a prescribed one of the function buttons output to the auxiliary display 151-2 is selected, a function corresponding to the selected function button can be run or executed.

Yet, as mentioned in the foregoing description, if the function buttons are output to the auxiliary display 151-2, it may be difficult to easily run the function buttons. The reason for this is described as follows. First of all, the auxiliary display 151-2 may be provided to a lateral surface of the mobile terminal 100. Secondly, while the mobile terminal 100 is gripped with one hand, it is difficult to select a function button using the corresponding hand. Hence, according to one embodiment of the present invention, each of the functions is run using a touch gesture. Such an embodiment shall be described in detail with reference to FIG. 26 as follows.

FIG. 26 is a diagram illustrating a controlling method of running a function button output to an auxiliary display according to one embodiment of the present invention. FIG. 26(a) is a perspective diagram to illustrate both a main display 151-1 and an auxiliary display 151-2. Referring to FIG. 26(a), the mobile terminal 100 outputs an application running screen 1500 through the main display 151-1 and also outputs a button region 2400 through the auxiliary display 151-2.

If the button region 2400 is output through the main display 151-1, a running command of each button may include an input touching a location of each button. Yet, since it is not easy to precisely touch the auxiliary display 151-2 (particularly, when simultaneously performing one action of gripping a mobile terminal with one hand and another action of touching a button with the same hand), a touch gesture may be preferably used.

FIG. 26(b) is a diagram of functions corresponding to touch gestures in table form. First to third functions are the functions respectively correspond to function buttons included in the button region 2400. In response to an input performed by applying a touch 10j to a prescribed point of the button region 2400 and then applying a drag 10k in a top direction by maintaining the touch 10j, the controller 180 can run the first function.

In response to a double touch 10m applied to the button region 2400, the controller 180 can run the second function. In response to an input performed by applying a touch 10n to a prescribed point of the button region 2400 and then applying a drag 10p in a bottom direction by maintaining the touch 10n, the controller 180 can run the third function.

In this instance, considering directionality of the drag movement, the first function may include a function corresponding to a first button 2402 output to a top portion of the button region 2400 and the third function may include a function corresponding to a third button 2404 output to a bottom portion of the button region 2400. Moreover, the second function may include a function corresponding to a second button 2403 output to a middle portion of the button region 2400.

Meanwhile, according to one embodiment of the present invention, a controlling method of facilitating an access to a recently accessed webpage on a web browser application is provided. Such an embodiment is described in detail with reference to FIG. 27 as follows. FIG. 27 is a diagram illustrating a controlling method of outputting a list of recently accessed webpages during an output of a web browser running screen according to one embodiment of the present invention.

Referring to FIG. 27(a), the controller 180 currently outputs an execution screen (hereinafter named a web running screen) 2702 of a web browser application through a main display 151-1. While the web running screen 2702 is output, if a back tap input is detected, the controller 180 can output a list 2700 of recently accessed webpages to an auxiliary display 151-2. According to the example shown in FIG. 27(b), the webpage list 2700 may include at least one or more webpage items 2700a to 2700c.

If a touch gesture 10q and 10r for selecting a prescribed one of the at least one or more webpage items 2700a to 2700c is received, the controller 180 can output a page preview popup window 2701 for the selected webpage item 2700a. In this instance, the page preview popup window 2701 may include a screen corresponding to a most recent access (cf. FIG. 27(c)).

If an input of touching the page preview popup window 2701 is received, the controller 180 switches a webpage previously displayed on the web running screen 2702 to a webpage for the selected webpage item 2700a and can then output the switched webpage.

Accordingly, embodiments of the present invention provide various effects and/or features. According to at least one of embodiments of the present invention, a user interface (UI) appropriate for a flexible display employed mobile terminal can be provided.

It will be apparent to those skilled in the art that the present invention can be specified into other form(s) without departing from the spirit or scope of the inventions. The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit having a main display region exposed on a front surface and auxiliary display regions exposed on lateral surfaces, wherein the auxiliary display regions are inseparably coupled to the main display region; and
   a controller configured to:

display an execution screen of an application on a first region of the main display region and an indicator region on a second region of the main display region, wherein the indicator region includes indicators that are configured to display operating states of the mobile terminal, and wherein the second region is separated from the first region and does not overlap the first region, select a first indicator region including at least one indicator in the indicator region in response to an input to the mobile terminal, detect an inclination of the mobile terminal toward one of the auxiliary display regions and select an auxiliary display region for moving the indicators thereto among the auxiliary display regions based on a detected direction of the inclination of the mobile terminal, move the selected first indicator region from the second region of the main display region to the selected auxiliary display region to which the mobile terminal is inclined in response to the detected inclination of the mobile terminal, select a second indicator region including remaining indicators in the indicator region in response to another input to the mobile terminal, detect a different inclination of the mobile terminal toward a different one of the auxiliary display regions and select the different auxiliary display region for moving the remaining indicators thereto among the auxiliary display regions based on a detected direction of the different inclination of the mobile terminal, move the second indicator region including remaining indicators in the indicator region to the different auxiliary display region, such that the indicator region is removed from the main display region, and extend the execution screen of the application over the first region to occupy the second region of the main display region.

2. The mobile terminal of claim 1, further comprising:
a sensing unit configured to detect a tapping input received through a rear surface of the mobile terminal and detect the inclination of the mobile terminal.

3. The mobile terminal of claim 2, wherein the auxiliary display regions comprise a right auxiliary display region provided to a right lateral surface of the display unit and a left auxiliary display region provided to a left lateral surface of the display unit.

4. The mobile terminal of claim 3, wherein the controller is further configured to:
determine the detected tapping input as a left tapping input or a right tapping input depending on a location of the received tapping input,
move the indicator region to the left lateral surface if the move command is the left tapping input, and
move the indicator region to the right lateral surface if the move command is the right tapping input.

5. The mobile terminal of claim 2, wherein the controller is further configured to:
receive the tapping input on a first side of the rear surface of the mobile terminal, and
move objects displayed on the display unit to a first side of the display unit located opposite to the first side of the rear surface, such that the moved objects are directly manipulated by a finger other than a finger used for the tapping input.

6. The mobile terminal of claim 1, wherein the controller is further configured to:
display an address input window for inputting a webpage on the main display region, and
move the address input window to the auxiliary display region in response to the inclination of the mobile terminal.

7. The mobile terminal of claim 1, wherein controller is further configured to:
display a text notification indicator indicating a text message has been received on the selected auxiliary display region, and
display an auxiliary indicator on the main display region adjacent to the text notification indicator, wherein the auxiliary indicator is displayed while only the main region is oriented to a user to inform the user that the text notification indicator is displayed.

8. The mobile terminal of claim 7, wherein the controller is further configured to:
display contents of the received text message on the main display region in response to a selection input of the text notification indicator.

9. The mobile terminal of claim 8, further comprising:
a sensing unit configured to detect a tapping input received through a rear surface of the mobile terminal, wherein the selection input comprises the detected tapping input.

10. The mobile ten final of claim 8, wherein the controller is further configured to:
display a text input window and a virtual keypad for inputting a reply to the received text message in response to the selection input of the text notification indicator.

11. The mobile terminal of claim 1, wherein the operating states of the mobile terminal include a current hour, a battery state and a radio signal reception strength.

12. A method of controlling a mobile terminal, the method comprising:
displaying an execution screen of an application on a first region of a main display region exposed on a front surface of a display unit and an indicator region on a second region of the main display region, wherein the indicator region includes indicators that are configured to display operating states of the mobile terminal, and wherein the second region is separated from the first region and does not overlap the first region;

selecting, via a controller, a first indicator region including at least one indicator in the indicator region in response to an input to the mobile terminal:

detecting, via a sensing unit of the mobile terminal, an inclination of the mobile terminal toward one of auxiliary display regions which are exposed on lateral surfaces, wherein the auxiliary display regions are inseparably coupled to the main display region, and selecting an auxiliary display region for moving the indicators among the auxiliary display regions based on a detected direction of the inclination of the mobile terminal;

moving, via the controller, the selected first indicator region from the second region of the main display to the selected auxiliary display region to which the mobile terminal is inclined in response to the detected inclination of the mobile terminal;

selecting, via the controller, a second indicator region including remaining indicators in the indicator region in response to another input to the mobile terminal;

detecting, via the sensing unit, a different inclination of the mobile terminal toward a different one of the auxiliary display regions and selecting the different auxiliary display region for moving the remaining indicators thereto among the auxiliary display regions based on a detected direction of the different inclination of the mobile terminal, moving, via the controller, the second indicator region including remaining indicators in the indicator region to the different auxiliary display region other than the selected auxiliary region, such that the indicator region is removed from the main display region; and extending, via the controller, the execution screen of the application over the first region to occupy the second region of the main display.

13. The method of claim 12, further comprising:
detecting, via the sensing unit of the mobile terminal, a tapping input received through a rear surface of the mobile terminal.

14. The method of claim 13, wherein the auxiliary display regions comprise a right auxiliary display region provided to a right lateral surface of the display unit and a left auxiliary display region provided to a left lateral surface of the display unit.

15. The method of claim 13, further comprising:
receiving, via the sensing unit of the mobile terminal, the tapping input on a first side of the rear surface of the mobile terminal; and moving, via the controller, objects displayed on the display unit to a first side of the display unit located opposite to the first side of the rear surface, such that the moved objects are directly manipulated by a finger other than a finger used for the tapping input.

16. The method of claim 14, further comprising:
determining the detected tapping input as a left tapping input or a right tapping input depending on a location of the received tapping input;

moving the indicator region to the left lateral surface if the move command is the left tapping input; and moving the indicator region to the right lateral surface if the move command is the right tapping input.

17. The method of claim 12, further comprising:
displaying an address input window for inputting a webpage on the main display region; and moving the address input window to the auxiliary display region in response to the inclination of the mobile terminal.

18. The method of claim 12, further comprising:
displaying a text notification indicator indicating a text message has been received on the selected auxiliary display region; and displaying an auxiliary indicator on the main display region adjacent to the text notification indicator, wherein the auxiliary indicator is displayed while only the main display region is oriented to a user to inform the user that the text notification indicator is displayed.

19. The method of claim 18, further comprising:
displaying contents of the received text message on the main display region in response to a selection input of the text notification indicator.

20. The method of claim 19, further comprising:
detecting, via a sensing unit of the mobile terminal, a tapping input received through a rear surface of the mobile terminal, wherein the selection input comprises the detected tapping input.

21. The method of claim 19, further comprising:
displaying a text input window and a virtual keypad for inputting a reply to the received text message in response to the selection input of the text notification indicator.

22. The method of claim 12, wherein the operating states of the mobile terminal include a current hour, a battery state and a radio signal reception strength.

* * * * *